United States Patent
Filsfils et al.

(10) Patent No.: US 11,722,404 B2
(45) Date of Patent: *Aug. 8, 2023

(54) COMMUNICATING PACKETS ACROSS MULTI-DOMAIN NETWORKS USING COMPACT FORWARDING INSTRUCTIONS

(71) Applicant: Cisco Technology, Inc., San Jose, CA (US)

(72) Inventors: Clarence Filsfils, Brussels (BE); Francois Clad, Strasbourg (FR); Zafar Ali, Hicksville, NY (US); Peter Psenak, Bratislava (SK)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/404,817

(22) Filed: Aug. 17, 2021

(65) Prior Publication Data

US 2021/0377163 A1    Dec. 2, 2021

Related U.S. Application Data

(63) Continuation of application No. 16/580,944, filed on Sep. 24, 2019, now Pat. No. 11,140,074.

(51) Int. Cl.
*H04L 12/721* (2013.01)
*H04L 45/00* (2022.01)
(Continued)

(52) U.S. Cl.
CPC .............. *H04L 45/34* (2013.01); *H04L 45/04* (2013.01); *H04L 69/22* (2013.01)

(58) Field of Classification Search
CPC ..... H04L 45/50; H04L 61/2592; H04L 45/34; H04L 45/12; H04L 61/305;
(Continued)

(56) References Cited

U.S. PATENT DOCUMENTS 4,853,843 A    8/1989 Ecklund
5,448,718 A    9/1995 Cohn
(Continued)

FOREIGN PATENT DOCUMENTS

CN      1726679 A    1/2006
CN    101247253 A    8/2008
(Continued)

OTHER PUBLICATIONS

Office Action for U.S. Appl. No. 16/580,944, dated May 14, 2021, Filsfils, "Communicating Packets Across Multi-Domain Networks Using Compact Forwarding Instructions", 21 Pages.
(Continued)

*Primary Examiner* — Jung Liu
(74) *Attorney, Agent, or Firm* — Lee & Hayes, P.C.

(57) ABSTRACT

Techniques and mechanisms for compressing the size of SIDs to be smaller than a complete IPv6 address (or "micro SIDs"), and scaling micro SIDs across a multi-domain environment using micro SID-domain-blocks. Segment routing over IPv6 (SRv6) uses 128-bit IPv6 addresses as SIDs for segment routing. According to this disclosure, multiple SRv6 SIDs may be expressed in a compact format such that a 128-bit IPv6 address, such as the destination address field of the IPv6 header, may store multiple micro SIDs. Further, SID-domain-blocks may be assigned to each domain in a multi-domain network such that micro SIDs may be expressed in the context of a given domain, rather than being shared in the global multi-domain network. In this way, lists of domain-specific SIDs may be fully expressed in the IPv6 destination address of the packet to scale micro SID into large, multi-domain networks.

17 Claims, 6 Drawing Sheets

(51) Int. Cl.
*H04L 69/22* (2022.01)
*H04L 45/02* (2022.01)

(58) Field of Classification Search
CPC .............. H04L 61/2007; H04L 47/125; H04L 61/6059; H04L 47/34; H04L 45/42; H04L 67/141; H04L 45/00; H04L 45/741; H04L 45/121; H04L 45/02; H04L 45/04; H04L 45/302
See application file for complete search history.

(56) References Cited

U.S. PATENT DOCUMENTS

| | | |
|---|---|---|
| 5,654,695 A | 8/1997 | Olnowich |
| 5,699,521 A | 12/1997 | Iizuka |
| 5,764,624 A | 6/1998 | Endo |
| 6,032,197 A | 2/2000 | Birdwell |
| 6,147,976 A | 11/2000 | Shand |
| 6,374,303 B1 | 4/2002 | Armitage |
| 6,577,600 B1 | 6/2003 | Bare |
| 6,647,428 B1 | 11/2003 | Bannai |
| 6,882,627 B2 | 4/2005 | Pieda |
| 6,904,462 B1 | 6/2005 | Sinha |
| 6,963,570 B1 | 11/2005 | Agarwal |
| 7,023,846 B1 | 4/2006 | Andersson |
| 7,031,253 B1 | 4/2006 | Katukam |
| 7,031,607 B1 | 4/2006 | Aswood Smith |
| 7,035,209 B2 | 4/2006 | Dang |
| 7,061,921 B1 | 6/2006 | Sheth |
| 7,068,654 B1 | 6/2006 | Joseph |
| 7,072,346 B2 | 7/2006 | Hama |
| 7,088,721 B1 | 8/2006 | Droz et al. |
| 7,099,286 B1 | 8/2006 | Swallow |
| 7,154,416 B1 | 12/2006 | Savage |
| 7,174,387 B1 | 2/2007 | Shand |
| 7,180,887 B1 | 2/2007 | Schwaderer |
| 7,209,975 B1 | 4/2007 | Zang |
| 7,260,097 B2 | 8/2007 | Casey |
| 7,286,479 B2 | 10/2007 | Bragg |
| 7,330,440 B1 | 2/2008 | Bryant |
| 7,359,377 B1 | 4/2008 | Kompella |
| 7,373,401 B1 | 5/2008 | Azad |
| 7,420,992 B1 | 9/2008 | Fang |
| 7,430,210 B2 | 9/2008 | Havala |
| 7,457,237 B2 | 11/2008 | Zetterlund |
| 7,462,639 B2 | 12/2008 | Georges |
| 7,463,639 B1 | 12/2008 | Rekhter |
| 7,466,661 B1 | 12/2008 | Previdi |
| 7,471,669 B1 | 12/2008 | Sabesan |
| 7,489,866 B2 | 2/2009 | Ozugur |
| 7,551,550 B2 | 6/2009 | Sinha |
| 7,564,803 B1 | 7/2009 | Minei |
| 7,568,047 B1 | 7/2009 | Aysan |
| 7,577,143 B1 | 8/2009 | Kompella |
| 7,593,340 B2 | 9/2009 | Li |
| 7,602,778 B2 | 10/2009 | Guichard |
| 7,610,330 B1 | 10/2009 | Quinn |
| 7,627,243 B2 | 12/2009 | Sadananda |
| 7,697,455 B2 | 4/2010 | Sadanada |
| 7,773,630 B2 | 8/2010 | Huang |
| 7,817,667 B2 | 10/2010 | Frederiksen |
| 7,885,179 B1 | 2/2011 | Bryant |
| 7,885,259 B2 | 2/2011 | Filsfils |
| 7,885,294 B2 | 2/2011 | Patel |
| 7,894,352 B2 | 2/2011 | Kompella |
| 7,894,458 B2 | 2/2011 | Jiang |
| 7,903,554 B1 | 3/2011 | Manur |
| 7,940,695 B1 | 5/2011 | Bahadur |
| 7,970,929 B1 | 6/2011 | Mahalingaiah |
| 7,983,174 B1 | 7/2011 | Monaghan |
| 8,064,441 B2 | 11/2011 | Wijnands |
| 8,121,126 B1 | 2/2012 | Moisand |
| 8,131,126 B2 | 3/2012 | Kowalczyk |
| 8,339,973 B1 | 12/2012 | Pichumani |
| 8,345,682 B2 | 1/2013 | Pignataro |
| 8,422,514 B1 | 4/2013 | Kothari |
| 8,542,706 B2 | 9/2013 | Wang |
| 8,542,709 B2 | 9/2013 | Kim |
| 8,611,335 B1 | 12/2013 | Wu |
| 8,619,817 B1 | 12/2013 | Everson |
| 8,630,167 B2 | 1/2014 | Ashwood Smith |
| 8,630,176 B2 | 1/2014 | Shaheen |
| 8,711,883 B2 | 4/2014 | Kang |
| 8,743,679 B2 | 6/2014 | Gerstel |
| 8,792,384 B2 | 7/2014 | Banerjee |
| 8,848,728 B1 | 9/2014 | Revah et al. |
| 8,923,292 B2 | 12/2014 | Friskney |
| 8,953,590 B1 | 2/2015 | Aggarwal |
| 9,036,474 B2 | 5/2015 | Dibirdi |
| 9,049,233 B2 | 6/2015 | Frost |
| 9,094,337 B2 | 7/2015 | Bragg |
| 9,112,734 B2 | 8/2015 | Edwards |
| 9,118,572 B2 | 8/2015 | Sajassi |
| 9,288,110 B2 | 3/2016 | Liu |
| 9,319,312 B2 | 4/2016 | Filsfils |
| 9,325,525 B2 | 4/2016 | Goel |
| 9,485,150 B2 | 11/2016 | Filsfils |
| 9,571,349 B2 | 2/2017 | Previdi |
| 9,596,169 B2 | 3/2017 | Choudhury |
| 9,660,897 B1 | 5/2017 | Gredler |
| 9,667,550 B2 | 5/2017 | Gredler |
| 9,749,227 B2 | 8/2017 | Frost |
| 9,794,148 B1 | 10/2017 | Ramachandran |
| 9,923,798 B1 | 3/2018 | Bahadur |
| 10,469,325 B2 | 11/2019 | Previdi |
| 10,637,675 B2 | 4/2020 | Wijnands et al. |
| 10,805,204 B1 | 10/2020 | Morris |
| 10,880,203 B2 | 12/2020 | Nainar |
| 10,958,566 B2 | 3/2021 | Eckert et al. |
| 11,290,340 B2 | 3/2022 | Bashandy |
| 11,323,356 B2 | 5/2022 | Psenak |
| 11,336,574 B2 | 5/2022 | Previdi |
| 2001/0037401 A1 | 11/2001 | Soumiya |
| 2001/0055311 A1 | 12/2001 | Trachewsky |
| 2002/0003780 A1 | 1/2002 | Braun |
| 2002/0059432 A1 | 5/2002 | Masuda |
| 2002/0103732 A1 | 8/2002 | Bundy |
| 2002/0131424 A1 | 9/2002 | Suemura |
| 2002/0191545 A1 | 12/2002 | Pieda |
| 2003/0016678 A1 | 1/2003 | Maeno |
| 2003/0026271 A1 | 2/2003 | Erb |
| 2003/0043747 A1 | 3/2003 | Edwin |
| 2003/0043798 A1 | 3/2003 | Pugel |
| 2003/0126272 A1 | 7/2003 | Corl |
| 2003/0131130 A1 | 7/2003 | Malkosh |
| 2003/0133412 A1 | 7/2003 | Iyer |
| 2003/0142674 A1 | 7/2003 | Casey |
| 2003/0142685 A1 | 7/2003 | Bare |
| 2003/0147352 A1 | 8/2003 | Ishibashi |
| 2003/0154110 A1 | 8/2003 | Walter |
| 2003/0174644 A1 | 9/2003 | Yagyu |
| 2003/0231634 A1 | 12/2003 | Henderson |
| 2004/0160958 A1 | 8/2004 | Oh |
| 2004/0165537 A1 | 8/2004 | Lee |
| 2004/0174879 A1 | 9/2004 | Basso |
| 2004/0190527 A1 | 9/2004 | Okura |
| 2004/0196840 A1 | 10/2004 | Amrutur |
| 2004/0202158 A1 | 10/2004 | Takeno |
| 2004/0202171 A1 | 10/2004 | Hama |
| 2004/0205237 A1 | 10/2004 | Doshi |
| 2004/0205239 A1 | 10/2004 | Doshi |
| 2004/0218612 A1 | 11/2004 | Zetterlund |
| 2004/0218923 A1 | 11/2004 | Ozugur |
| 2004/0240442 A1 | 12/2004 | Grimminger |
| 2005/0021803 A1 | 1/2005 | Wren |
| 2005/0073958 A1 | 4/2005 | Atlas |
| 2005/0088965 A1 | 4/2005 | Atlas |
| 2005/0105515 A1 | 5/2005 | Reed |
| 2005/0157724 A1 | 7/2005 | Montuno |
| 2005/0198304 A1 | 9/2005 | Oliver |
| 2005/0213513 A1 | 9/2005 | Ngo |
| 2005/0259655 A1 | 11/2005 | Cuervo |
| 2005/0286411 A1 | 12/2005 | Alicherry |
| 2006/0002304 A1 | 1/2006 | Ashwood-Smith |

(56) References Cited

U.S. PATENT DOCUMENTS

| | | |
|---|---|---|
| 2006/0004916 A1 | 1/2006 | Caviglia |
| 2006/0013209 A1 | 1/2006 | Somasundaram |
| 2006/0056397 A1 | 3/2006 | Aizu |
| 2006/0075134 A1 | 4/2006 | Aalto |
| 2006/0080421 A1 | 4/2006 | Hu |
| 2006/0092940 A1 | 5/2006 | Ansari |
| 2006/0114818 A1 | 6/2006 | Canali |
| 2006/0126272 A1 | 6/2006 | Horio |
| 2006/0140111 A1 | 6/2006 | Vasseur |
| 2006/0140190 A1 | 6/2006 | Lee |
| 2006/0146696 A1 | 7/2006 | Li |
| 2006/0187817 A1 | 8/2006 | Charzinski |
| 2006/0262735 A1 | 11/2006 | Guichard |
| 2006/0274716 A1 | 12/2006 | Oswal |
| 2007/0019647 A1 | 1/2007 | Roy |
| 2007/0041345 A1 | 2/2007 | Yarvis |
| 2007/0053342 A1 | 3/2007 | Sierecki |
| 2007/0058607 A1 | 3/2007 | Mack-Crane |
| 2007/0058638 A1 | 3/2007 | Guichard |
| 2007/0189291 A1 | 8/2007 | Tian |
| 2007/0245034 A1 | 10/2007 | Retana |
| 2008/0002664 A1 | 1/2008 | Li |
| 2008/0002699 A1 | 1/2008 | Rajsic |
| 2008/0010227 A1 | 1/2008 | Matichuk |
| 2008/0037117 A1 | 2/2008 | Seki |
| 2008/0049610 A1 | 2/2008 | Linwong |
| 2008/0075016 A1 | 3/2008 | Ashwood-Smith |
| 2008/0075117 A1 | 3/2008 | Tanaka |
| 2008/0084881 A1 | 4/2008 | Dharwadkar |
| 2008/0101227 A1 | 5/2008 | Fujita |
| 2008/0101239 A1 | 5/2008 | Goode |
| 2008/0172497 A1 | 7/2008 | Mohan |
| 2008/0189393 A1 | 8/2008 | Wagner |
| 2008/0192762 A1 | 8/2008 | Kompella |
| 2008/0212465 A1 | 9/2008 | Yan |
| 2008/0225864 A1 | 9/2008 | Aissaoui |
| 2008/0253367 A1 | 10/2008 | Ould-Brahim |
| 2008/0259820 A1 | 10/2008 | White |
| 2008/0316916 A1 | 12/2008 | Tazzari |
| 2009/0003349 A1 | 1/2009 | Havemann |
| 2009/0003364 A1 | 1/2009 | Fendick |
| 2009/0041038 A1 | 2/2009 | Martini |
| 2009/0049194 A1 | 2/2009 | Csaszar |
| 2009/0067348 A1 | 3/2009 | Vasseur |
| 2009/0067445 A1 | 3/2009 | Diguet |
| 2009/0080431 A1 | 3/2009 | Rekhter |
| 2009/0086644 A1 | 4/2009 | Kompella |
| 2009/0103442 A1 | 4/2009 | Douville |
| 2009/0135815 A1 | 5/2009 | Pacella |
| 2009/0141721 A1 | 6/2009 | Filsfils |
| 2009/0196289 A1 | 8/2009 | Shankar |
| 2009/0217318 A1 | 8/2009 | VerSteeg |
| 2009/0247157 A1 | 10/2009 | Yoon |
| 2009/0296710 A1 | 12/2009 | Agrawal |
| 2010/0061720 A1 | 3/2010 | Fiaschi |
| 2010/0063983 A1 | 3/2010 | Groarke |
| 2010/0088717 A1 | 4/2010 | Candelore |
| 2010/0124231 A1 | 5/2010 | Kompella |
| 2010/0142548 A1 | 6/2010 | Sheth |
| 2010/0220739 A1 | 9/2010 | Ishiguro |
| 2010/0232435 A1 | 9/2010 | Jabr |
| 2010/0272110 A1 | 10/2010 | Allan |
| 2010/0284309 A1 | 11/2010 | Allan |
| 2010/0302935 A1 | 12/2010 | Zhang |
| 2010/0329153 A1 | 12/2010 | Xu |
| 2011/0021193 A1 | 1/2011 | Hong |
| 2011/0060844 A1 | 3/2011 | Allan |
| 2011/0063986 A1 | 3/2011 | Denecheau |
| 2011/0080827 A1 | 4/2011 | Zetterlund |
| 2011/0087784 A1 | 4/2011 | Liu |
| 2011/0090913 A1 | 4/2011 | Kim |
| 2011/0149973 A1 | 6/2011 | Esteve Rothenberg et al. |
| 2011/0228780 A1 | 9/2011 | Ashwood-Smith |
| 2011/0261722 A1 | 10/2011 | Awano |
| 2011/0268114 A1 | 11/2011 | Wijnands |
| 2011/0273980 A1 | 11/2011 | Ashwood Smith |
| 2011/0280123 A1 | 11/2011 | Wijnands |
| 2011/0280580 A1 | 11/2011 | Wexler |
| 2011/0286452 A1 | 11/2011 | Balus |
| 2012/0014690 A1 | 1/2012 | Gruber |
| 2012/0044944 A1 | 2/2012 | Kotha |
| 2012/0063526 A1 | 3/2012 | Xiao |
| 2012/0069740 A1 | 3/2012 | Lu |
| 2012/0069845 A1 | 3/2012 | Carney |
| 2012/0075988 A1 | 3/2012 | Lu |
| 2012/0082034 A1 | 4/2012 | Vasseur |
| 2012/0099861 A1 | 4/2012 | Zheng |
| 2012/0106560 A1 | 5/2012 | Gumaste |
| 2012/0120808 A1 | 5/2012 | Nandagopal |
| 2012/0140679 A1 | 6/2012 | Inaba |
| 2012/0170461 A1 | 7/2012 | Long |
| 2012/0179796 A1 | 7/2012 | Nagaraj |
| 2012/0185229 A1 | 7/2012 | Perrett |
| 2012/0213225 A1 | 8/2012 | Subramanian |
| 2012/0218884 A1 | 8/2012 | Kini |
| 2012/0224506 A1 | 9/2012 | Gredler |
| 2012/0236860 A1 | 9/2012 | Kompella |
| 2012/0243539 A1 | 9/2012 | Keesara |
| 2012/0287818 A1 | 11/2012 | Corti |
| 2012/0307629 A1 | 12/2012 | Vasseur |
| 2012/0307644 A1 | 12/2012 | Gandhi |
| 2013/0003728 A1 | 1/2013 | Kwong |
| 2013/0051237 A1 | 2/2013 | Ong |
| 2013/0077476 A1 | 3/2013 | Enyedi |
| 2013/0077624 A1 | 3/2013 | Keesara |
| 2013/0077625 A1 | 3/2013 | Khera |
| 2013/0077626 A1 | 3/2013 | Keesara |
| 2013/0114402 A1 | 5/2013 | Ould-Brahim |
| 2013/0142052 A1 | 6/2013 | Burbidge |
| 2013/0188634 A1 | 7/2013 | Magee |
| 2013/0219034 A1 | 8/2013 | Wang |
| 2013/0258842 A1 | 10/2013 | Mizutani |
| 2013/0266012 A1 | 10/2013 | Dutta |
| 2013/0266013 A1 | 10/2013 | Dutta |
| 2013/0308948 A1 | 11/2013 | Swinkels |
| 2013/0322449 A1 | 12/2013 | Hwang |
| 2013/0343204 A1 | 12/2013 | Geib |
| 2014/0010074 A1 | 1/2014 | Ye |
| 2014/0044036 A1 | 2/2014 | Kim |
| 2014/0098675 A1 | 4/2014 | Frost |
| 2014/0160925 A1 | 6/2014 | Xu |
| 2014/0169370 A1 | 6/2014 | Filsfils |
| 2014/0177638 A1 | 6/2014 | Bragg |
| 2014/0189156 A1 | 7/2014 | Morris |
| 2014/0192677 A1 | 7/2014 | Chew |
| 2014/0254596 A1 | 9/2014 | Filsfils |
| 2014/0269266 A1 | 9/2014 | Filsfils |
| 2014/0269421 A1 | 9/2014 | Previdi |
| 2014/0269422 A1 | 9/2014 | Filsfils |
| 2014/0269698 A1 | 9/2014 | Filsfils |
| 2014/0269699 A1 | 9/2014 | Filsfils |
| 2014/0269721 A1 | 9/2014 | Bashandy |
| 2014/0269725 A1 | 9/2014 | Filsfils |
| 2014/0269727 A1 | 9/2014 | Filsfils |
| 2014/0286195 A1 | 9/2014 | Fedyk |
| 2014/0317259 A1 | 10/2014 | Previdi |
| 2014/0341222 A1 | 11/2014 | Filsfils |
| 2014/0369356 A1 | 12/2014 | Bryant |
| 2015/0023328 A1 | 1/2015 | Thubet |
| 2015/0030020 A1 | 1/2015 | Kini |
| 2015/0109902 A1 | 4/2015 | Kumar |
| 2015/0249587 A1 | 9/2015 | Kozat |
| 2015/0256456 A1 | 9/2015 | Previdi |
| 2015/0263940 A1 | 9/2015 | Kini |
| 2015/0319086 A1 | 11/2015 | Tripathi |
| 2015/0326675 A1 | 11/2015 | Kini |
| 2015/0334006 A1 | 11/2015 | Shao |
| 2015/0381406 A1 | 12/2015 | Francois |
| 2016/0006614 A1 | 1/2016 | Zhao |
| 2016/0021000 A1 | 1/2016 | Previdi |
| 2016/0034209 A1 | 2/2016 | Nanduri |
| 2016/0034370 A1 | 2/2016 | Nanduri |
| 2016/0087933 A1 | 3/2016 | Johnson |
| 2016/0105314 A1 | 4/2016 | Logue |

(56) References Cited

U.S. PATENT DOCUMENTS

| | | | |
|---|---|---|---|
| 2016/0119159 A1 | 4/2016 | Zhao | |
| 2016/0119229 A1 | 4/2016 | Zhou | |
| 2016/0127142 A1 | 5/2016 | Tian | |
| 2016/0173366 A1 | 6/2016 | Saad | |
| 2016/0191372 A1 | 6/2016 | Zhang | |
| 2016/0254987 A1 | 9/2016 | Eckert | |
| 2016/0254988 A1 | 9/2016 | Eckert | |
| 2016/0254991 A1 | 9/2016 | Eckert | |
| 2016/0323237 A1 | 11/2016 | Warfield | |
| 2016/0352654 A1 | 12/2016 | Filsfils | |
| 2017/0019330 A1 | 1/2017 | Filsfils | |
| 2017/0033939 A1 | 2/2017 | Bragg et al. | |
| 2017/0104673 A1 | 4/2017 | Bashandy | |
| 2017/0111277 A1 | 4/2017 | Previdi | |
| 2017/0302561 A1 | 10/2017 | Filsfils | |
| 2017/0302571 A1 | 10/2017 | Frost | |
| 2017/0346718 A1 | 11/2017 | Psenak | |
| 2017/0346737 A1 | 11/2017 | Previdi | |
| 2017/0366453 A1 | 12/2017 | Previdi | |
| 2018/0034730 A1 | 2/2018 | Zhao | |
| 2018/0077051 A1 | 3/2018 | Nainar | |
| 2018/0083871 A1 | 3/2018 | Filsfils | |
| 2018/0131532 A1 | 5/2018 | Wijnands | |
| 2018/0198706 A1 | 7/2018 | Ceccarelli | |
| 2018/0324090 A1 | 11/2018 | Duncan | |
| 2019/0002058 A1 | 1/2019 | Bashandy | |
| 2019/0097925 A1 | 3/2019 | Previdi | |
| 2019/0222483 A1 | 7/2019 | Bashandy | |
| 2019/0312806 A1 | 10/2019 | Psenak | |
| 2019/0349303 A1 | 11/2019 | Previdi | |
| 2020/0044936 A1 | 2/2020 | Previdi | |
| 2020/0153732 A1* | 5/2020 | Negi | H04L 45/34 |
| 2020/0228446 A1* | 7/2020 | Geng | H04L 12/4633 |
| 2020/0296025 A1* | 9/2020 | Wang | H04L 45/28 |
| 2020/0358694 A1 | 11/2020 | Psenak | |
| 2020/0382379 A1 | 12/2020 | Bashandy | |
| 2021/0083973 A1* | 3/2021 | Peng | H04L 45/32 |
| 2021/0083975 A1* | 3/2021 | Chunduri | H04L 45/741 |
| 2021/0084009 A1* | 3/2021 | Du | H04L 45/02 |
| 2021/0092053 A1 | 3/2021 | Filsfils et al. | |
| 2021/0359942 A1 | 11/2021 | Previdi | |

FOREIGN PATENT DOCUMENTS

| | | |
|---|---|---|
| CN | 101399688 A | 4/2009 |
| CN | 101931548 A | 6/2009 |
| CN | 101496357 A | 7/2009 |
| CN | 101616466 A | 12/2009 |
| CN | 101803293 A | 8/2010 |
| CN | 101841442 A | 9/2010 |
| CN | 102098222 A | 6/2011 |
| CN | 102132533 A | 7/2011 |
| CN | 102299852 A | 12/2011 |
| CN | 102498694 A | 6/2012 |
| CN | 102714925 A | 10/2012 |
| WO | WO2008021195 A1 | 2/2008 |
| WO | WO2011032430 A1 | 3/2011 |
| WO | WO2014188638 A1 | 11/2014 |
| WO | WO2016095710 A1 | 6/2016 |

OTHER PUBLICATIONS

Previdi, "Segment Routing Extensisn I-leaders," U.S. Appl. No. 14/212,084 filed on Mar. 14, 2014; consisting of Specification, Claims and Abstract (43 pages); and Drawings (17 sheets).
Francois, "Loop Avoidance During Network Convergence in Switched Networks,"U.S. Appl. No. 14/319,353, filed on Jun. 30, 2014: consisting of Specification, Claims and Abstract (29 pages); and Drawings (6 sheets).
Previdi, "Segment Routing Using A Remote Forwarding Adjacency Identifier," U.S. Appl. No. 14/334,300 filed on Jul. 17, 2014: consisting of Specification, Claims arid Abstract (23 pages); and Drawings (8 sheets).
Eckert et al., "Traffic Engineering for Bit Indexed Explicit Replication,"U.S. Appl. No. 14/814,574 filed on Jul. 31, 2015; consisting of Specification, Claims, and Abstract (75 pages); and Drawings (18 sheets).
Eckert et al., "Traffic Engineering for Bit Indexed Explicit Replication,"U.S. Appl. No. 14/814,575 filed on Jul. 31, 2015; consisting of Specification, Claims, and Abstract (75 pages); and Drawings (18 sheets).
Eckert et al., "Traffic Engineering for Bit Indexed Explicit Replication,"U.S. Appl. No. 14/862,915 filed on Sep. 23, 2015; consisting of Specification, Claims, and Abstract (75 pages); and Drawings (18 sheets).
Eckert et al., "Failure Protection for Traffic-Engineering for Bit Indexed Explicit Replication,"U.S. Appl. No. 15/054,480 filed on Feb. 26, 2016; consisting of Specification, Claims, and Abstract (76 pages).
Psenak at al., "Enforcing Strict Shortest Path Forwarding Using Strict Segment Identifiers," U.S. Appl. No. 15/165,794 filed on May 26, 2016; consisting of Specification, Claims, Abstract, and Drawings (52 pages).
Nainar, et al., "Reroute Detection in Segment Reuting Data Plane," U.S. Appl. No. 15/266,498 filed on Sep. 15, 2016; consisting of Specification, Claims. Abstract and Drawings (61 pages).
Filsfils et al., "Segment Routing into a Label Distribution Protocol Domain," U.S. Appl. No. 15/233,262 filed on Sep. 29, 2016; consisting of Specification, Claims, Abstract, and Drawings (28 pages).
Frost et al., "MPLS Segment Routing" U.S. Appl. No. 15/537,744 filed on Jun. 29, 2017; consisting of Specification, Claims, Abstract, and Drawings; (26 pages),
Filsfils et al., "Seamless Segment Routing,"U.S. Appl. No. 15/639,398 filed on Jun. 30, 2017; consisting of Specification, Claims, Abstract, and Drawings (31 pages).
Previdi et al., "Segment Routing Extension Headers." U.S. Appl. No. 15/677,210 filed on Aug. 15, 2017 consisting of Specification, Claims, Abstract, and Drawings (58 pages).
Aggarwal et al. "MPLS Upstream Label Assignment and Context Specific Label Space;" Cisco Systems, Inc.; Network Working Group; Internet Draft; Jan. 2005; pp. 1-8.
Akiya et al., "Seamless Bidirectional Forwarding Detection (BFD) for Segment Routing (SR)," draft-akiya-bfd-seamless-sr-02; Internet Engineering Task Farce: Internet-Draft; Jun. 7, 2014; 7 pages.
Akiya et al., "Seamless Bidirectional Forwarding Detection (BFD) for Segment Routing (SR)," draft-akiya-bfd-seamless-sr-01; Internet Engineering Task Farce: Internet-Draft; Dec. 5, 2013; 7 pages.
Akiya et al., "Seamless Bidirectional Forwarding Detection (S-BFD) for Segment Routing (SR)," draft-akiya-bfd-seamless-sr-03; Internet Engineering Task Farce: Internet-Draft; Aug. 23, 2014; 7 pages.
Akiya et al., "Seamless Bidirectional Forwarding Detection (S-BFD) for Segment Routing (SR)," draft-akiya-bfd-seamless-sr-04; Internet Engineering Task Farce: Internet-Draft; Feb. 23, 2015; 7 pages.
Akiya et al., "Segment Routing Implications on BFD," Sep. 9, 2013; 3 pages.
Alcatel-Lucent, "Segment Routing and Path Computation Element—Using Traffic Engineering to Optimize Path Placement and Efficiency in EP/MPLS Networks," Technoiogy White Paper; 2015; 28 pages.
Aldrin et al., "Seamless Bidirectional Forwarding Detection (S-BFD) Use Cases," draft-ietf-bfd-seamless-use-case-08; Network Working Group; Internet-Draft; May 6, 2016; 15 pages.
Awduche at al., "Overview and Principles of Internet Traffic Engineering" Network Working Group; Request far Comments: 3272; May 2002; pp. 1-71.
Awduche et al., "Requirements for Traffic Engineering Over MPLS," Network Warking Group; Request for Comments: 2702; Sep. 1999; pp. 1-29.
Awduche et al., "RSVP-TE: Extensions to RSVP for LSP Tunnels," Network Working Group, Internet-Draft, Aug. 2000, pp. 1-12.
Awduche et al., "RSVP-TE: Extensions to RSVP for LSP Tunnels," Network Working Group, Request for Comments 3209, Dec. 2001, pp. 1-61.
Backes, "Deutsche Telekom AG's Statement About IPR Related to Draft-Geig-Spring-OAM-Usecase-01," Aug. 23, 2012, pp. 1-2.

(56) References Cited

OTHER PUBLICATIONS

Backes, "Deutsche Telekom AG's Statement About IPR Related to Draft-Geig-Spring-OAM-Usecase-01," Feb. 5, 2014, pp. 1-2.
Bryant et al., "IP Fast Reroute Using Tunnels-draft-bryant-ipfrr-tunnels-03", Cisco Systems, Network Working Group, Internet-Draft, Nov. 16, 2007, pp. 1-30.
Bryant, et al., "Remote LFA FRR," Cisco Systems, draft-ietf-rtgwg-remote-lfa-04, Network Working Group, Internet-Draft, Nov. 22, 2013, pp. 1-24.
Camarillo et al., "Network Programming extension: SRv6 USID Instruction;" Draft-Filsfils-Spring-Net-PGM-Extension-SRV6-usid-04, Internet-Draft: Spring, Internet Engineering Task Force, IETF; Standard Working Draft, INT, No. 4, pp. 1-14, XP015137883. Feb. 25, 2020; published Dec. 12, 2022.
Camarillo, et al., "SRV6 Network Programming; Draft-letf-Spring-SRV6-Network programming- 00," Internet-Draft: Spring, Internet Engineering task force, IETF; pp. 1-42, XP015132673, Apr. 24, 2019.
Chen et al., "Path Segment for SRv6 (Segment Routing in IPv6)," Draft-Li-Spring-Srv6- Path-Segment-00; Internet-Draft: Spring Working Group, Internet Engineering Task Force, IETF; pp. 1-8, XP015129457. Oct. 22, 2018.
Cisco Systems, Inc., "Introduction to Intermediate System-to-Intermediate System Protocol," publicshed 1992-2002; pp. 1-25.
Crabbe, et al., "PCEP Extensions for MPLS-TE LSP Protection With Stateful PCE Draft-Crabbe-PCEStatetul-PCT-Protection-00," Network Working Group, Internet- Draft, Apr. 2013, pp. 1-12.
Crabbe, et al., "Stateful PCE Extensions for MPLS-TE LSPs, draft-crabbe-pce-statment-pce-mpls-te-00," Network Working Group, Internet- Draft, Oct. 15, 2012, pp. 1-15.
Crabbe, et al., "Stateful PCE Extensions for MPLS-TE LSPs, draft-crabbe-pcestatment-pce-mpls-te-00," Network Working Group, Internet- Draft, Apr. 15, 2013, pp. 1-15.
Deering, et al., "Internet Protocol, Version 6 (1Pv6) Specification," Cisco, Network Working Group, Request for Comments 2460, Dec. 1998, pp. 1-39.
Eckert, "Traffic Engineering for Bit Index Explicit Replication BIER-TE, draft-eckert-bier-te-arch-00," Network Working Group. Internet -Draft, Mar. 5, 2015, pp. 1-21.
Eckert, "Traffic Engineering for Bit Index Explicit Replication BIER-TE, draft-eckert-bier-te-arch-01," Network Working Group. Internet -Draft, Jul. 5, 2015, pp. 1-23.
Farrel et al., "A Path Computation Element (PCE)- Based Architecture," Old Dog Consulting, Network Working Group, Request for Comments 4655, Aug. 2006, pp. 1-80.
Farrel et al., Inter-Domain MPLS and GMPLS Traffic Enginerring—Resource Reservation Protocol-Traffic Enginerring (RSVP-TE) Extensions, Old Dog Consulting, Nework Working Group, Request for Comments 5151, Feb. 2008, pp. 1-25.
Fedyk et al, "Generalized Multiprotocol Labal Switching (GMPLS) Control Ethernet Provider Backbane Traffic Engineering (PBB-TE)," Alcatel-Lucent, Internet Engineering Task Force (IETF), Request for Comments 6060, Mar. 2011, pp. 1-20.
Filsfils, et al., "Segment Routing Use Cases, draft-filsfils-rtgwg-segment-routing-use-cases-02." Network Working Group; Internet-Draft; Oct. 21, 2013; pp. 1-36.
Filsfils, "Segment Routing Architecture." draft-filsfils-rtgwg-segment-routing-01, Cisco Sytems, Inc., Network Working Group, Internet-Draft, Oct. 21, 2013, pp. 1-28.
Filsfils et al., "Segment Routing Architecture." draft-ietf-spring-segment-routing-07, Network Working Group, Internet-Draft, Dec. 15, 2015, pp. 1-24.
Filsfils et al., "Segment Routing Interoperability with LDP," Cisco Systems, Inc., draft-filsfil-spring-segment-routing-ldp-interop-01.txt, Apr. 18, 2014, pp. 1-16.
Filsfils et al., "Segment Routing Architecture." draft-filsfil-rtgwg-segment-routing-00, Cisco Systems, Inc., Jun. 28, 2013, pp. 1-28.
Filsfils et al., "Segment Routing Use Cases," draft-filsfil-rtgwg-segment-routing-use-cases-01, Network Working Group; Internet-Draft; Jul. 14, 2013, pp. 1-46.

Filsfils et al., "Segment Routing MPLS Data Plane," draft-ietf-spring-segment-routing-mpls-05, Network Working Group; Internet-Draft; Jul. 6, 2016, 15 pages.
Frost et al., "MPLS Generic Associated Channel (G-Ach) Advertisement Protocol," Cisco Systems, Inc., Request for Comments 7212, Jun. 2014; pp. 1-23.
Frost et al., "MPLS Generic Associated Channel (G-Ach) Advertisement Protocol, draft-ietf-mpls-gach-adv-00," Internet-Draft, Cisco Systems, Inc., Jan. 27, 2012; pp. 1-17.
Frost et al., "MPLS Generic Associated Channel (G-Ach) Advertisement Protocol, draft-ietf-mpls-gach-adv-08," Cisco Systems, Inc., Internet-Draft, Jun. 7, 2013; pp. 1-17.
Geib, "Segment Routing Based OAM Use Case," IETF 87, Gerlin, Jul./Aug. 2013, pp. 1-3.
Geib, "Use Case for a Scalable and Topology Aware MPLS data plan monimoring System, draft-geib-spring-oam-usecase-00;" Deutsch Telekom, Internet-Draft; Oct. 17, 2013, pp. 1-11.
Geib, "Use Case for a Scalable and Topology Aware MPLS data plan monitoring System, draft-geib-spring-oam-usecase-01;" Deutsch Telekom, Internet-Draft; Feb. 5, 2014, pp. 1-10.
Gredler et al., "Advertising MPLS LSPs in the IGP," hannes@juniper.net, IETF87, Berlin, draft-gredler-ospf-label-advertisement, May 21, 2013; pp. 1-14.
Gredler et al., "Advertising MPLS Labels in IS-IS draft-gredler-isis-label-advertisment-00," Juniper Networks, Inc., Internet-Draft; Apr. 5, 2013; pp. 1-13.
Guilbaud et al. "Google-Localizing Packet Loss in a Large Complex Network." Feb. 5, 2013, pp. 1-43.
Imaizumi et al., "FMEHR: An Alternative Approach to Multi-Path Forwarding on Packed Switched Networks," Networks, 2005; pp. 198-201.
International Search Report and Written Opinion for International Applicatiom No. PCT/US2020/030342 dated Jul. 28, 2020.
Kompella et al., "Detecting Multi-Protocol Labal Switched (MPLS) Data Plane Failures," Juniper Networks, Inc., Network Working Group, Request for Comments 4379, Feb. 2006, pp. 1-50.
Kompella et al., "Labal Switched Paths (LSP) Hierarchy with Generalized Multi-Protocol Label Switching (GMPLS) Traffic Enginerring (TE)," Juniper Networks, Network Working Group, Request for Comments 4206, Oct. 2005, pp. 1-14.
Kompella et al., "Virtual Private LAN Service (VPLS) Using BGP for Auto-Discovery and Signaling," Juniper Networks, Network Working Group, Request for Comments 4761, Jan. 2007, pp. 1-28.
Kumar et al., "Label Switched Path (LSP) Ping/Trace for Segment Routing Networks Using MPLS Dataplane," draft-kumarkini-mpls-spring-lsp-ping-00, Network Work Group, Internet-Draft, Jan. 2, 2014, pp. 1-15.
Kumar et al., "Label Switched Path (LSP) Ping/Trace for Segment Routing Networks Using MPLS Dataplane," Cisco Systems, Inc., draft-kumar-mpls-spring-isp-ping-00, Oct. 21, 2013, pp. 1-12.
Kumar et al., "Label Switched Path (LSP) Ping/Trace for Segment Routing Networks Using MPLS Dataplane," draft-ietf-mpls-spring-isp-ping-00, Network Work Group, Internet Draft; May 10, 2016, 17 pages.
Kumar et al., "OAM Requirements for Segment Routing Network," draft-kumar-spring-sr-oam-requirment-02; Spring; Internet-Draft; Dec. 31, 2014, 6 pages.
Kumar et al., "OAM Requirements for Segment Routing Network," draft-kumar-spring-sr-oam-requirment-03; Spring; Internet-Draft; Mar. 9, 2015, 6 pages.
Kumar et al., "OAM Requirements for Segment Routing Network," draft-kumar-spring-sr-oam-requirment-03; Spring; Internet-Draft; Jul. 1, 2014, 6 pages.
Li et al., "IS-IS Extensions for Traffic Engineering," Redback Networks, Inc., Network Working Group, Request for Comments 5305, Oct. 2008, 17 pages.
Pignataro et al. "Seamless Bidirectional Forwarding Detection (S-BFD) for IPv4, IPv6 and MPLS," draft-ietf-bfd-seamless-ip-06; Internet Engineering Task Force; Internet-Draft; May 5, 2016; 8 pages.
Pignataro et al. "Seamless Bidirectional Forwarding Detection (S-BFD)," draft-ietf-bfd-seamless-base-11; Internet Engineering Task Force; Internet-Draft; May 6, 2016; 21 pages.

(56) References Cited

OTHER PUBLICATIONS

Previdi et al., "IS-IS Extensions for Segment Routing," draft-ietf-isis-segment-routing-extensions-05; IS-IS for IP Internets, Internet-Draft; Jun. 30, 2015; pp. 1-37.
Previdi et al., "Segment Routing with IS-IS Routing Protocol," draft-previdl-filsils-isis-segment-routing-00; Cisco Systems, Inc., IS-IS for IP Internets, Internet-Draft; Mar. 12, 2013; pp. 1-37.
Previdi et al., "Segment Routing with IS-IS Routing Protocol," draft-previdl-filsils-isis-segment-routing-02; Cisco Systems, Internet-Draft; Mar. 20, 2013; A55 pp. 1-37.
Previdi et al., "IS-IS Extensions for Segment Routing," draft-ietf-isis-segment-routing-extensions-06; IS-IS for IP Internets, Internet-Draft; Dec. 14, 2015; pp. 1-39.
Psenak et al. "OSPF Extensions for Segment Routing, draft-ietf-ospf-segmunt-routing-extensions-05," Ooen Shortest Path First IGP: Internet-Draft• Jun. 26, 2015: pp. 1-29.
Raszuk, "MPLS Domain Wide Labels, draft-raszuk-mpls-domain-widelabels-00." NTT 13, MPLS Working Group, Internet-Draft, Jul. 14, 2013, pp. 1-6.
Rosen et al., "BGP/MPLS VPNS," Cisco Systems; Inc., Network Working Group, Request for Comments: 2547; Mar. 1999, pp. 1-26.
Sivabalan et al., "PCB-Initiated Traffic Engineering Path Setup in Segment Routed Networks; draft-sivabailan-pce-segmentrouting-00.txt," Internet Engineering Task Force, IETF; Standard Working Draft, Internet Society (ISOC) 4, Rue Des Falaises CH-1205, Geneva, Switzerland, Jun. 17, 2013, pp. 1-16.
Tian et al., "Source Routed MPLS LSP Using Domain Wide Label, draft-tian-mpls-lsp-source-route-01.txt", Redback Networks, Network Working Group, Internet Draft, Jul. 2004, pp. 1-12.
Vasseur et al., "A Link-Type Sub-TLV to Corvey the Number (if Traffic Engineering Label Switched Paths Signaled with zero Reserved Bandwidth Acroas a Link," Cisco Systems, Inc. Network Working Group, Request for Comments 5330; Oct. 2008, 16 pages.
Vasseur et al.; "Path Computation Element (PCE) Communication Protocol (PCEP): Request for Comments: 5440, Internet Engineering Task Force," Cisco Systems, IETF; Standard, Internet Society (ISOC) 4, Rue Des Falaises CH-1205, Geneva, Switzerland. chapters 4-8, Mar. 2009; pp. 1-87.
Wijnands et al, "Muilticast Extensions for LDP;" Cisco Systems, Inc,; NTT Communications; Network Working Group; Internet Draft; Mar. 2005; pp. 1-12.
Bryant et al., "Opportunistic Compression of Routing Segment Identifier Stacks," U.S. Appl. No. 14/449,632, Filed Aug. 1, 2014, Consisting of Specification, Claims and Abstract and Drawings, 59 Pages.
Wijnands at el., "Area-Specific Broadcasting Using Bit Indexed Explicit Replication," U.S. Appl. No. 15/347,443 filed Nov. 9, 2018, Consisting of Specification, Claims, Abstract and Drawings, 65 Pages.
Bashandy et al., "Segment Routing Over Label Distribution Protocol. ," U.S. Appl. No. 16/367,869, filed Mar. 28, 2019, 37 pages.
Psenak et al., Enforcing Strict Shortest Path Forwarding Using Strict Segment Identifier,' U.S. Appl. No. 15/384,219 filed on Apr. 15, 2019; consisting of Specification, Claims, Abstract, and Drawings, 48 pages
Eckert et al. "Traffic Engineering for Bit Indexed Explicit Replication"; U.S. Appl. No. 16/457,339 filed on Jun. 28, 2019; consisting of Specificatipn Claims Abstract and Drawings (88 pages).
Previdi, et al. "Segment Routing Extension Headers",; U.S. Appl. No. 16/525,000 filed on Jul. 29 2019; vonsisting of Specification, Claims, Abstract, and Drawings (57 pages).
Previdi et al., "Segment Routing Extension Headers," U.S. Appl. No. 17/387,114, Filed on Jul. 28, 2021, consisting of Specification, Claims and Abstract and Drawings, 59 pages.
Akiya, et al. "Seamless Bidirectional Fouwarding Detection (BFD) for Segment Routing (SR)," drafl-akiya-bfdseamless-sr-00; Internet Engineering Task Force; Internet-Draft; Jun. 7, 2013; 7 pages.

Awduche et al., "RSVP-TE: Extensions to RSVP for LSP Tunnels." Network Working Group, Internet-Draft, Feb. 2001, pp. 1-12.
Bocci et al., "MPLS Generic Associated Channel." Network Working Group, RFC 5586, The Internet Society, Reston, VA, USA, Jun. 2009, 19 pages.
Crabbe et al. Stateful PCE Extensions for MPLS-TE LSPs, draft-crabbe-pcestatement-pce-mpls-te-00; Network Working Group, Internet- Draft: Apr. 15, 2013, pp. 1-15.
Extended European Search Report for European Application No. 19205362.6, dated Jan. 21, 2020, 9 Pages.
Extended European Search Report for European Application No. 21178606.6, dated Aug. 24, 2021, 9 Pages.
International Preliminary Report on Patentability for International Application No. PCT/US2014/028709, dated Sep. 24, 2015, 8 pages.
International Preliminary Report on Patentability for International Application No. PCT/US2013/063603, dated Apr. 7, 2015, 10 Pages.
International Preliminary Report on Patentability for International Application No. PCT/US2013/063516, dated Apr. 7, 2015, 9 pages.
International Preliminary Report on Patentability for International Application No. PCT/US2014/018226, dated Sep. 15, 2015, 9 pages.
International Preliminary Report on Patentability for International Application No. PCT/US2014/027934, dated Sep. 15, 2015, 8 pages.
International Preliminary Report on Patentability for International Application No. PCT/US2014/028526, dated Sep. 15, 2015, 8 pages.
International Preliminary Report on Patentability for International Application No. PCT/US2013/063603, dated Dec. 17, 2013, 12 pages.
International Preliminary Report on Patentability for International Application No. PCT/US2013/063516, dated Dec. 3, 2013, 11 pages.
International Preliminary Report on Patentability for International Application No. PCT/US2014/028709, dated May 30, 2014, 11 pages.
International Preliminary Report on Patentability for International Application No. PCT/US2014/027934, dated Jun. 2, 2014, 11 pages.
International Preliminary Report on Patentability for International Application No. PCT/US2014/028526, dated Jun. 3, 2014, 10 pages.
International Preliminary Report on Patentability for International Application No. PCT/US2014/018226, dated Jul. 2, 2014, 10 pages.
Kopmella et al., "The Use of Entropy Labels in MPLS Forwarding," Internet Engineering Task Force (IETF), Request for Comments 6790, Level 3 Communications, Inc., Nov. 2012. pp. 1-25.
Kompella et al, "Label Switched Paths (LSP) Hierarchy with Generalized Multi-Protocol Label 46 Switching (GMPLS) Traffic Engineering (TE)," Juniper Networks, ,Network Working Group, Request for Comments 4206, Oct. 2005, pp. 1-14.
Papadimitriou et al., "Inference of Shared Risk Link Groups," draft-many-inference-srig-02.txt, Internet Working Group, Internet Draft, Nov. 2001, pp. 1-18.
Previdi, et al., "IPv6 Segment Routing Header (SRH)" draft-previdi-6man-segment-routing-header-00, Network Working Group, Internet-Draft, Mar. 5, 2014, 22 pages.
Rosen at al. "Multiprotocol Label Switching Architecture," Cisco Systems Inc., Network Working Group Request for comments: 3031; Jan. 2001 pp. 1-61.
Wikipedia, "Shared Risk Resource Group," retrieved from <<https://en.wikipedia.org/wiki/Shared_Risk_Resource_Group.>> May 17, 2018, pp. 1-5.

* cited by examiner

400 ⟶

┌─────────────────────────────────────────────────────────────────┐
│ RECEIVING AN INTERNET PROTOCOL VERSION 6 (IPV6) PACKET HAVING AN IPV6 |
│ HEADER INCLUDING A DESTINATION ADDRESS FIELD THAT IS POPULATED WITH A |
│ FIRST DESTINATION ADDRESS THAT INCLUDES A FIRST SID-DOMAIN-BLOCK |
│ ASSIGNED TO A FIRST DOMAIN, A FIRST SID CORRESPONDING TO A FIRST |
│ NETWORK NODE IN THE FIRST DOMAIN, AND A SECOND SID CORRESPONDING TO A |
│ SECOND NETWORK NODE IN A SECOND DOMAIN |
│ 402 |
└─────────────────────────────────────────────────────────────────┘
                                    ↓
┌─────────────────────────────────────────────────────────────────┐
│ MODIFYING, BASED AT LEAST IN PART ON AN INSTRUCTION, THE FIRST |
│ DESTINATION ADDRESS TO RESULT IN A SECOND DESTINATION ADDRESS |
│ INCLUDING A SECOND SID-DOMAIN-BLOCK ASSIGNED TO THE SECOND DOMAIN AND |
│ THE SECOND SID CORRESPONDING TO THE SECOND NETWORK NODE |
│ 404 |
└─────────────────────────────────────────────────────────────────┘
                                    ↓
┌─────────────────────────────────────────────────────────────────┐
│ SENDING, FROM THE FIRST NETWORK NODE, THE IPV6 PACKET HAVING THE IPV6 |
│ HEADER INCLUDING THE DESTINATION ADDRESS FIELD POPULATED WITH THE |
│ SECOND DESTINATION ADDRESS |
│ 406 |
└─────────────────────────────────────────────────────────────────┘

FIG. 4

COMMUNICATING PACKETS ACROSS MULTI-DOMAIN NETWORKS USING COMPACT FORWARDING INSTRUCTIONS

RELATED APPLICATIONS

This application claims priority to and is a continuation of U.S. patent application Ser. No. 16/580,944, filed on Sep. 24, 2019, the entire contents of which are incorporated herein by reference.

TECHNICAL FIELD

The present disclosure relates generally to routing packets through multi-domain networks using domain-specific, micro-segment routing instructions.

BACKGROUND

In computer networking, many technologies exist for devices to route data packets through networks. For example, routers and switches in many Internet Protocol (IP) networks utilize routing tables, or a set of rules, that list routes to particular network destinations and are used to determine where data packets are to be directed. Internet Protocol networks rely on the destination IP address to forward packets based on the content of routing tables that are populated in advance by routing protocols (e.g., OSPF, IS-IS, etc.). However, in IP networks, each device in a path of a data packet has to make independent routing decisions where the data packet is stored in the data plane of each router, and to find the next hop for the data packet, each router has to check the routing table in the control plane and change the destination MAC of the packet. Thus, each hop in the path of a data packet must analyze the entire IP header to determine the next hop, which is a time-consuming process and increases network latency.

Segment routing has been introduced as a flexible, scalable way of doing source routing where the source device chooses a path and encodes it in the packet header as an ordered list of segments. Segment routing divides a network into "segments" where each node and link in the network can be assigned a segment identifier, or an "SID," which gets advertised by each node using standard routing protocol extensions (IS-IS/OSPF or BGP), thereby eliminating the need to run additional label distribution protocols. Thus, routers in a segment router network do not require Label Distribution Protocol (LDP) and Resource Reservation Protocol-Traffic Engineering (RSVP-TE) to allocate or signal their SIDs and program their forwarding information. In segment routing, the source device chooses a path and encodes it in the packet header as an ordered list of segments where each segment is an identifier for a particular type of instruction. Rather than having to set up a forwarding path that is maintained by all nodes in a path, segment routing encodes the instruction, called a segment, into the packet and intermediate nodes forward the packet based on these instructions, thereby removing state from the network and reducing signaling overhead.

Segment Routing has been used over the Internet Protocol version 6 (IPv6) data plane (hereinafter "SRv6") where the SIDs are encoded as IPv6 addresses. An ordered list of segments is encoded as an ordered list of IPv6 addresses, and the active segment to process is in the destination address field of the IPv6 header. After completion of a segment, the next segment is copied in the IPv6 destination address header from a location in a Segment Routing Header (SRH) indicated by an index (or "Segments Left") in the SRH and the index value is decremented. The SID in SRv6 may represent a 128-bit structure consisting of two parts, the locator and the function. The locator may represent an address of a particular SRv6 node or segment, and the function is any type of function bound to the SRv6 SID that is executed locally on a particular node. After the node executes the function for a particular SID, the node decrements the Segments Left value in the SRF and copies the next segment into the IPv6 destination address field where the index in the segment list is indicated by the Segments Left value. Thus, nodes can simply perform the forwarding instructions in the stack of SIDs provided in the data packet, thereby steering data packets through an engineered path in the network independently of the IGP shortest paths and without introducing per-flow state at any intermediate router. Rather, the intermediate routers execute instructions in the segment list without requiring any knowledge of the end-to-end path or its intent. While segment routing is advantageous for various reasons including those described herein, segment routing may still suffer from some inefficiencies.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a flow diagram of an example method for an intermediary node in a multi-domain network to receive an IPv6 packet, modify the destination address by replacing a current SID-domain-block with a destination SID-domain-block, and sending the IPv6 onto a node in a destination domain according to the SID-domain-block.

DESCRIPTION OF EXAMPLE EMBODIMENTS

Overview

Figure 1:
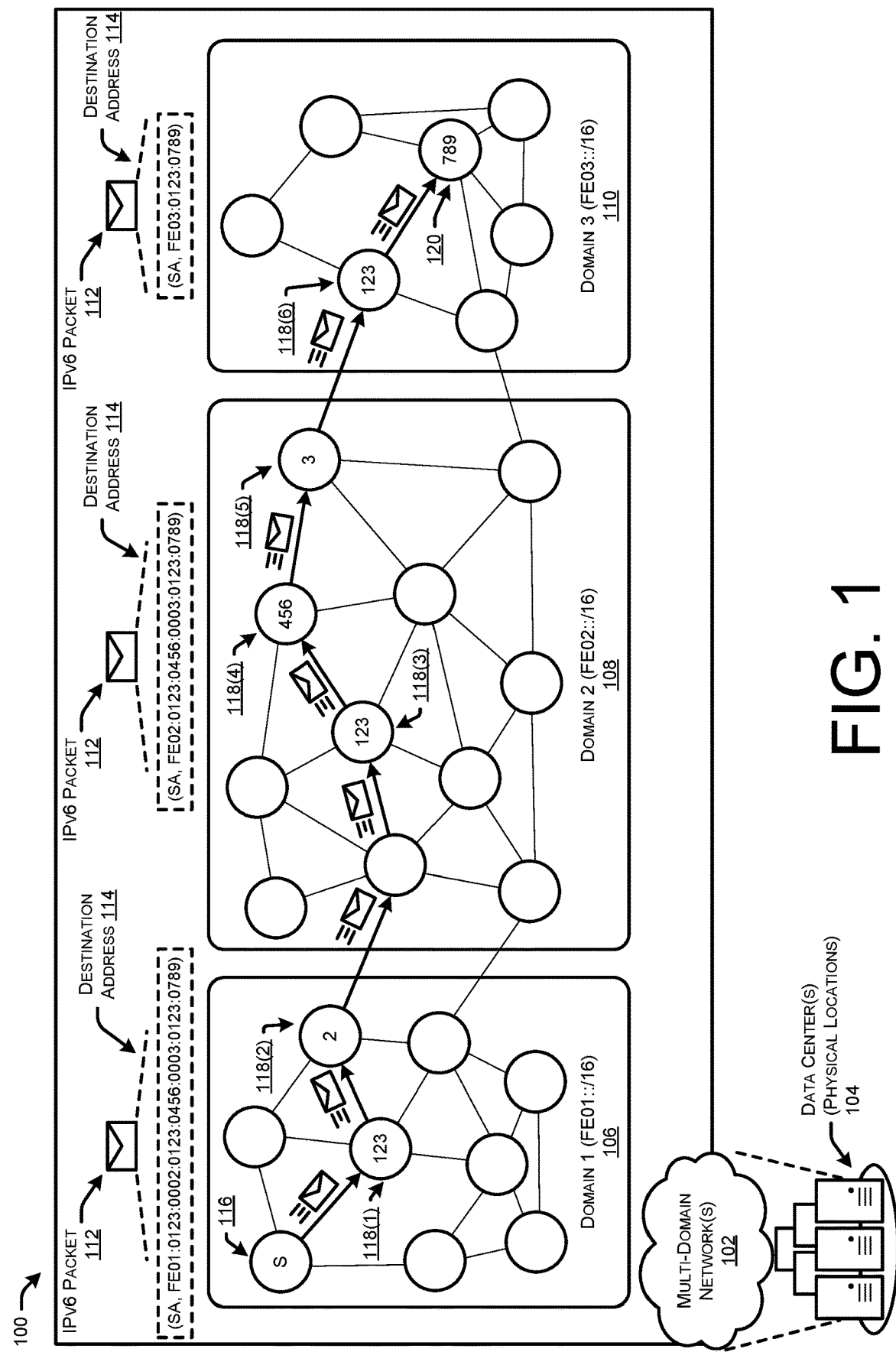
FIG. 1 illustrates a system-architecture diagram of an example multi-domain network in which a source device generates an IPv6 packet that is forwarded by intermediary devices onto a destination device using domain-specific, micro-segment routing instructions.

This disclosure describes techniques for routing packets through multi-domain networks using domain-specific, micro-segment routing instructions. A method performed by a first network node located in a first domain of a multi-domain network to perform techniques described herein includes receiving an Internet Protocol version 6 (IPv6) packet having an IPv6 header including a destination address field that is populated with a first destination address. In some examples, the first destination address may include a first segment identifier (SID)-domain-block assigned to the first domain, a first SID corresponding to the first network node, and a second SID corresponding to a second network node located in a second domain of the multi-domain network. Further, the first SID may be associated with an instruction to change the first SID-domain-block to a second SID-domain-block assigned to the second domain in which the second network node is located. Further, the method may include modifying, by the first network node and based at least in part on the instruction, the first destination address to result in a second destination address. The second destination address may include the second SID-domain-block assigned to the second domain, and the second SID corresponding to the second network node. Finally, the method may include sending, from the first network node, the IPv6 packet having the IPv6 header including the destination address field populated with the second destination address.

Additionally, the techniques described herein may be performed by a system and/or device having non-transitory computer-readable media storing computer-executable instructions that, when executed by one or more processors, performs the method described above.

Example Embodiments

Generally, segment routing over IPv6 (hereinafter "SRv6") comprises a technique of performing source routing where the source device selects a path over a network and places an ordered list of segment identifiers (hereinafter "SIDs") into a header of the IPv6 packet. The SIDs may comprise 128-bit IPv6 addresses that are placed into the header of the IPv6 packet where each IPv6 address indicates a locator, or an address of a particular SRv6 node or segment, and a function that is bound to the SID and is to be executed locally on a particular node. Thus, a source device can specify the path through the network that an IPv6 packet is to traverse using a listing of SIDs in a segment routing extension header (SRH) of the header of the IPv6 packet. However, listing the SIDS in the SRH of the IPv6 packet may require that intermediate nodes along the defined path be able to read deep enough into the packet to process the addresses in the SRH. While this is not an issue for high-end routers, many network processing units (NPUs) have limited reading capability into a packet, which may result in the intermediate routers being unable to read deep enough into the packet header and being forced to drop the packet (or punt it for software "slow-path" switching). Even if the intermediate nodes are able to read deep enough into the packet, the intermediate nodes may do so at the expense of recycling the packet, thereby suffering forwarding degradation.

This disclosure describes techniques and mechanisms for compressing the size of SIDs to be smaller than a complete IPv6 address (referred to herein as "micro SIDs" or "compressed SIDs"), and scaling the use of micro SIDs across a multi-domain environment using micro SID-domain-blocks. As noted above, SRv6 has traditionally used 128-bit IPv6 addresses as SIDs for segment routing. According to the techniques described herein, multiple SRv6 SIDs may be expressed in a compact format such that a 128-bit IPv6 address, such as the destination address field of the IPv6 header may store multiple compact or micro SIDs. Further, the techniques described herein include assigning SID-domain-blocks to each domain in a multi-domain network such that micro SIDs may be expressed in the context of a given domain, rather than being shared in the global multi-domain network. In this way, whole SID lists may be fully expressed in the IPv6 destination address of the packet, which enables SRv6 use-cases on medium-end routers that may not be able to read deep enough in the packet to process a Segment Routing Header (SRH).

In some examples, to express the SIDs in a compact format, a source router may populate the most significant bits in the IPv6 destination address field with a pre-defined value, called a micro-SID-block, which indicates that the following information is a list of micro SIDs. The concatenated list of micro SIDs is then encoded in the remaining bits of the IPv6 destination address field with each micro SID being expressed over a few bits instead of an entire 128-bit address. However, due to the limited number of bits in each micro SID, only a limited set of instructions is available for a network. For instance, a micro SID length of 16 bits provides 65,536 micro SID values and, with a micro SID block of 16 bits, up to 7 micro SIDs can be included in one 128-bit IPv6 address. While this is a lot of SIDs, this may be insufficient for large-scale, multi-domain deployments with hundreds of thousands or even millions of nodes.

In order to address the scaling issue of micro SIDs in a multi-domain environment, the techniques described herein describe micro SID-domain-blocks that are assigned to each domain in the multi-domain network. Rather than using the same SID-block across the whole multi-domain network, a sub-block of the global micro SID-block may be assigned for each domain. For example, domain 1 could have the micro SID-domain-block of "FE01::/16," and domain 2 could have the micro SID-domain-block of "FE02::/16," and so on. As an example, out of a global micro SID-block of 16 bits, 8 bits allocated for the domain would allow the identification of up to 256 domains. Following the above example, if there are 256 possible micro SID-blocks and the SIDs each have a length of 16 bits, more than 16 million micro SIDs would be available globally.

While utilizing per-domain SID blocks helps with scalability, using multiple micro SID-domain-blocks can increase IP header overhead. According to the techniques described herein, a block swapping mechanism may be introduced to switch from one domain context to another, thus enabling inter-domain segment routing policies to be expressed within a single IPv6 address. Specifically, the block swapping mechanism may be implemented as a new type of micro SID instruction whose behavior is the replacement of the current micro SID-domain-block with a specific new micro SID-domain-block. The block swapping micro SIDs can have a global or local scope and be advertised in the routing protocol of all connected domains. The IPv6 prefixes corresponding to these domain-swapping micro SIDs may be advertised by the domain border nodes into their connected domains (e.g., as anycast prefixes). For example, if the micro SID-domain-blocks are "FE01" to "FEFF," then the micro SIDs "0x0001" to "0x00FF" may be advertised and reserved in each domain for domain swapping SIDs.

Accordingly, a source node may determine a path for a data packet to reach its destination through multiple domains of a multi-domain network. The source node may include a current micro SID-domain-block followed by a list of SIDs for nodes/links in that domain that the packet is to traverse. As each SID instruction is executed by a node, the SID is removed from the IPv6 header. The source node may populate the IPv6 header with block swapping SIDs such that, when the data packet reaches a border node (or a node with reachability into the next domain), the border node may execute the block swapping SID to replace the current SID-domain-block with the SID-domain-block for the next domain the data packet is to traverse. In this way, the block swapping mechanism may enable assigning of SIDs to nodes and links that are domain-specific in order to reduce the size of SIDs from 128-bits to a lower value, and to also address scalability issues for large, multi-domain networks where limited availability of SIDs would traditionally have been an issue.

Although the techniques described herein are primarily with reference to IPv6, the techniques are generally applicable to any type of protocol, implemented at any layer, that may be used for segment routing using lists of SIDs. (e.g., MPLS). Similarly, the techniques may be applied for source routing between various types of nodes such as links, hardware devices, virtual resources (e.g., virtual machines, containers, etc.) running on devices, and/or any combination thereof. While the techniques are described with reference to the destination address header of IPv6 packets, the techniques are equally applicable to type of header or extension usable for segment routing and any type of packets used for segment routing.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example multi-domain network 102 in which a source device generates an IPv6 packet that is forwarded by intermediary devices onto a destination device using domain-specific, micro-segment routing instructions.

In some examples, one or more multi-domain network(s) 102 may be supported by devices that are housed or located in one or more data centers 104 (or other physical locations). The multi-domain networks 102 may include one or more networks implemented by any viable communication technology, such as wired and/or wireless modalities and/or technologies. The multi-domain network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The multi-domain network 102 may include devices, virtual resources, or other nodes that relay packets from one network segment to another by nodes in the computer network. The multi-domain network 102 may include multiple devices that utilize the network layer (and/or session layer, transport layer, etc.) in the OSI model for packet forwarding, and/or other layers.

Generally, a multi-domain network 102 may include multiple domains. As described herein, a network domain may comprise an administrative grouping of multiple computer networks or hosts within a same infrastructure. Each domain can be identified using a domain name, and may be assigned a micro SID-domain-block identifier as described herein. The domains may be accessible from the public Internet, and may be assigned a globally unique name within the Domain Name System (DNS). In some examples, a domain controller may automate various administrative duties for the domain, such as acting as a DNS server, managing logins, user groups, and the overall architecture of the domain.

The one or more data centers 104 may be physical facilities or buildings located across geographic areas that designated to store networked devices that are part of the multi-domain network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. In some examples, the data centers 104 (physical and/or virtual) may provide basic resources such as processor (CPU), memory (RAM), storage (disk), and networking (bandwidth). However, in some examples the devices in the packet-forwarding networks 102 may not be located in explicitly defined data centers 104, but may be located in other locations or buildings.

The multi-domain network 102 may include any type of networking device, such as servers, switches, routers, hubs, bridges, gateways, modems, repeaters, access points, etc. As illustrated, the multi-domain network 102 may be utilized to transmit, route, forward, or otherwise send a data packet, such as an IPv6 packet 112, to a destination device based on a destination address 114 in the IPv6 packet 112. In some instances, a source device 116 may determine to transmit the IPv6 packet 112 across the multi-domain network 102. For instance, a client device may have communicated a request to the source device 116 to utilize a service, application, etc., that is provided by or accessible to the destination device. The source device 116 may populate the IPv6 header with a destination address 114 in order to route the IPv6 packet 112 through the multi-domain network 102.

As noted above, the source device 116 may designate the path that the IPv6 packet is to traverse to the destination using a segment routing protocol over the IPv6 data plane (e.g., SRv6). Rather than using 128-bit IPv6 addresses for the SIDs in the segment routing path, the source device 116 may utilize micro SIDs to define the segment routing path. As described herein, a micro SID may comprise any number of bits that is less than a complete IPv6 address, such as the IPv6 prefix. The micro SID may be defined as having any particular value depending on the design of the multi-domain network 102, and implementation preference. In some examples, a micro SID may have a length of 16 bits as noted above.

Each micro SID may be associated with a locator and a function such that intermediary nodes in the path execute the function to, for example, forward the IPv6 packet 112 onto the next node or segment in the micro SID listing. Because micro SIDs are smaller than traditional SIDs for IPv6, a single 128-bit destination address header may be populated with multiple micro SIDs, thereby defining the segment routing path using less room in the header of the IPv6 packet 112.

To notify the intermediary nodes/devices 118 in the routing path that the destination address 114 includes a listing of micro SIDs, the source device 116 may populate the most significant bits in the destination address field of the IPv6 packet 112 with a pre-defined value, called a micro-SID-block, which indicates that the following information is a list of micro SIDs.

The concatenated list of micro SIDs is then encoded in the remaining bits of the IPv6 destination address field with each micro SID being expressed over a few bits instead of an entire 128-bit address. However, due to the limited number of bits in each micro SID, only a limited set of instructions is available for a network. For instance, a micro SID length of 16 bits provides 65,536 micro SID values and, with a micro SID block of 16 bits, up to 7 micro SIDs can be included in one 128-bit IPv6 address. While this is a lot of SIDs, this may be insufficient for large-scale, multi-domain deployments with hundreds of thousands or even millions of nodes.

However, to scale micro SIDs in the multi-domain network 102, the source device 116 may utilize micro SID-domain-blocks that are assigned to each domain in the multi-domain network 102. Rather than using the same SID-block across the whole multi-domain network, a sub-block of the global micro SID-block may be assigned for each domain. For example, domain 1 106 in the multi-domain network may be assigned the micro SID-domain-block of "FE01::/16," domain 2 108 may be assigned the micro SID-domain-block of "FE02::/16," and domain 3 110 may be assigned the micro SID-domain-block of "FE03::/16." Accordingly, when the source device 116 populates the destination address 114 with the list of micro SIDs which define the routing path for the IPv6 packet 112, the source device 116 may utilize a block swapping mechanism to swap SID-domain-blocks in the destination address 114. For instance, a micro SID may be associated with a function for swapping the SID-domain-block corresponding to when the IPv6 packet 112 is to cross domains in the multi-domain network 102.

Thus, the source device 116, may determine the path for the IPv6 data packet 112 to traverse to reach a destination device 120 through multiple domains (e.g., 106, 108, and 110) of the multi-domain network 102. The source device 116 (or node) may include a current micro SID-domain-block (e.g., FE01::/16 for domain 1 106) followed by a list of SIDs for nodes/links in domain 1 106 that the packet 112 is to traverse.

An example destination address 114 is illustrated in FIG. 1 as including a source address of the source device 116, and the following destination address 114 "FE01:0123:0002:0123:0456:0003:0123:0789." It is to be understood that the following example is merely illustrative of the techniques described herein, and the numbering and syntax is merely for illustrative purposes. After the source device 116 generate the IPv6 packet 112, the IPv6 packet 112 is send to the intermediary node 118(1) according to the micro SID instruction included in the destination address 114. The intermediary node 118(1) then processes the IPv6 packet in domain 1 106 as per the micro SID instruction bound to the micro-segment "0x0123" and forwards the IPv6 packet 112 onto the intermediary node 118(2) that is the closest border router. The IPv6 packet 112 is forwarded to the border router 118(2) as "FE01:0002:0123:0456:0003:0123:0789:0" because the "0x123" micro SID has been processed.

The border router 118(2) may then process the IPv6 packet 112 in domain 1 106, and may perform an instruction for block swapping that is bound to the "0x002" instruction processed by the border router 118(2). The "0x002" may cause the border router 118(2) to perform block swapping for the destination address 114, resulting in a destination address 114 of "FE02:0123:0456:0003:0123:0789:0", and forwards the WO packet 112 onto a border router in domain 2 108.

Once in domain 2 108, the IPv6 packet 112 is processed as per the instruction bound to the micro SID of "0x0123" in the domain 2 108 (which is different from instruction 0x0123 in domain 1 106). After processing the instruction bound to the micro SID of "0x0123" in domain 2 108, the IPv6 packet is forwarded as "SA, FE02:0456:0003:0123:0789," where ""SA" is the source address of the IPv6 packet, whatever the value may be. Similarly, the IPv6 packet 112 is then processed by intermediary node 118(4) according to the instruction bound to the assigned micro SID of "0x0456" in the domain 2 108. The intermediary node 118(4) may forward the IPv6 packet 112 onto a closest border router 118(5) to domain 2 with the designation address 114 of "SA, FE02:0003:0123:0789::."

The border router 118(5) may then execute the instruction that is bound to the micro SID "0x0003" in domain 2 108, which may be to perform the micro SID-domain-block swapping instruction. After executing the domain swapping instruction bound to the micro SID "0x0003," the border router 118(5) may forward the IPv6 packet 112 as "SA, FE03:0123:0789::" into domain 3 110. In domain 3 110, the IPv6 packet 112 is processed by the intermediary node 118(6) according to the instruction bound to the micro SID of "0x0123" in domain 3 110 (which is different form instructions "0x0123" in domain 1 106 and domain 2 108), which may cause the intermediary node 118(6) to forward the IPv6 packet 112 with a header of "SA, FE03:0789::." Finally, the destination device 120 may receive the IPv6 packet 112 and determine, based on the "0x0789" micro SID, that the IPv6 packet 112 is intended to reach the destination device 120. In some examples, the destination device 120 may determine to analyze the payload of the IPv6 packet 112 based on the packet 112 being intended to reach the destination device 120. The destination device 120 may then perform the appropriate action based on at least the payload of the IPv6 packet 112.

As shown in the above illustrative example, a source device 116 may designate a segment routing path using micro SIDs that are placed in a destination address 114 of an IPv6 packet 112. The instructions bound to one or more of the micro segments may cause certain intermediary nodes 118 (e.g., nodes 118(2) and 118(5)) to perform block swapping techniques. The block swapping techniques may cause certain intermediary nodes 118 to swap the SID-domain-block listed in the most significant bits of the destination address 114 from a current SID-domain-block to a target SID-domain-block for a domain in which the IPv6 packet 112 is about to enter. However, the SID-domain-block may populate any bit in the destination address 114, in some examples, and not necessarily the most significant bit.

It should be appreciated that the SIDs discussed herein may comprise prefix SIDs which may comprise SIDs that contain an IP address prefix calculated by an IGP in the service provider core network associated with the multi-domain network 102. The prefix SIDs may be globally unique to the multi-domain network 102. Further, the micro SIDs described here may include adjacency SIDs that contains an advertising router's adjacency to a neighbor. Generally, an adjacency SID may comprise a link between two routers and, because adjacency SIbs are relative to a specific router, adjacency SIDs are locally unique.

Generally, the size of the micro SIDs and the size of the SID-domain-block may be specified by a manager of the multi-domain network 102, and/or specified by the SRv6 protocol. Although illustrated as physical devices, in some examples, the source device 116, intermediary devices 118, and/or the destination device 120 may comprise virtual resources or virtual nodes in the packet-forwarding network 102.

Figure 2:
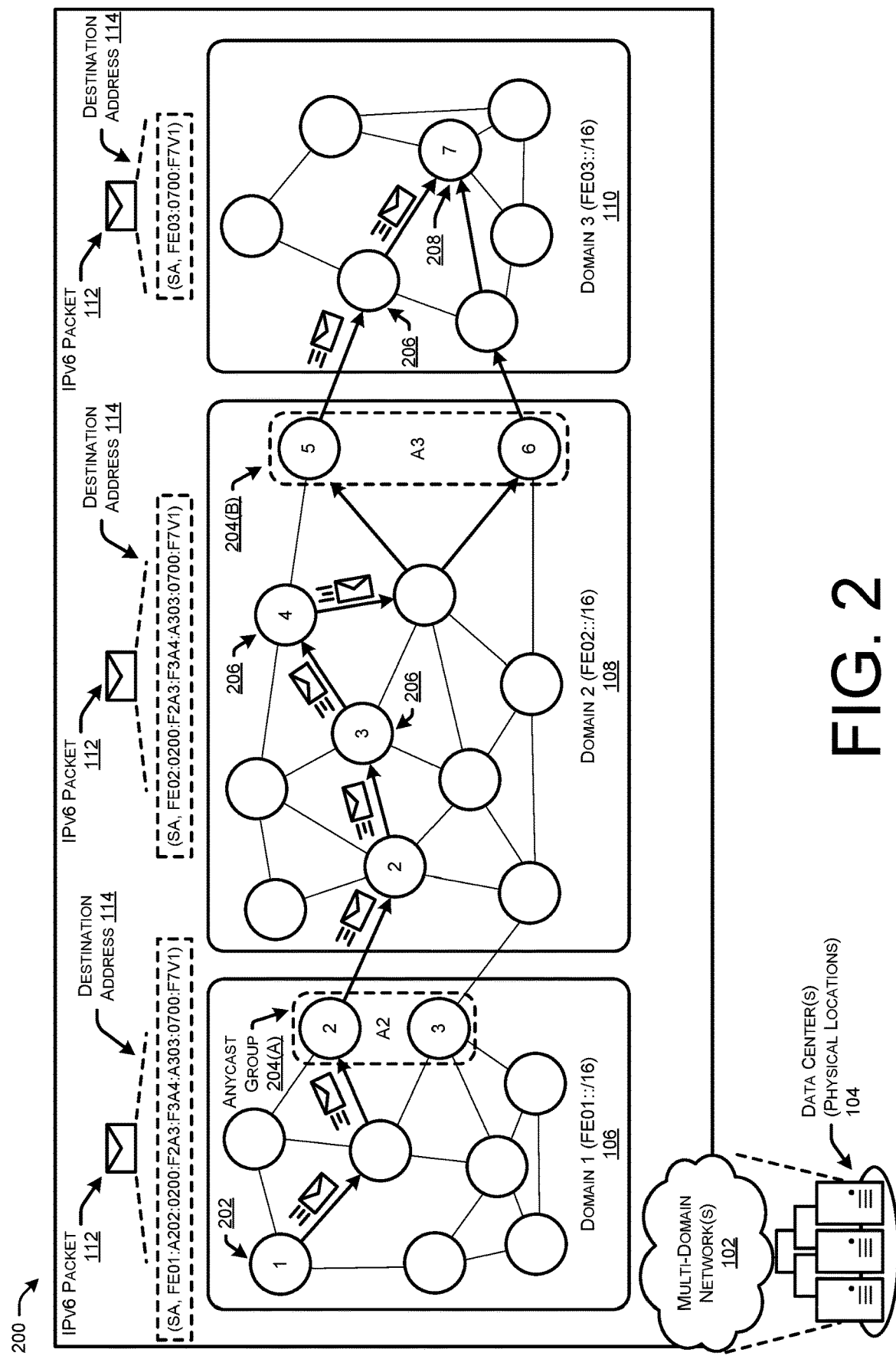
FIG. 2 illustrates a system-architecture diagram of an example multi-domain network in which a source device generates an IPv6 packet that is forwarded by intermediary devices included in anycast groups onto a destination device using domain-specific, micro-segment routing instructions.

FIG. 2 illustrates a system-architecture diagram 200 of an example multi-domain network in which a source device generates an IPv6 packet that is forwarded by intermediary devices included in anycast groups onto a destination device using domain-specific, micro-segment routing instructions.

In some examples, the principle of anycast groups may be utilized to steer traffic along a multi-domain path. For instance, a source device 202 may determine a path through a multi-domain network 102 and populate an IPv6 packet 112 with a destination address 114 that includes micro SIDs for anycast groups. As illustrated, the initial destination address 114 may be "SA, FE01:A202:0200:F2A3:F3A4: A303:0700:F7V1" when the source device 202 populates the destination address field of the IPv6 packet 112. As the IPv6 packet 112 traverses the path defined by the destination address, the IPv6 packet 112 will be delivered to the "closest" node in the anycast group 204(A), or load-balanced among the set of nodes at the closest distance, according to the principles of anycast routing.

As illustrated, the IPv6 packet 112 has a destination address 114 that includes the micro SID "A202" which corresponds to anycast group 204(A). The IPv6 packet 112 is routed to the closest node ("2") in the anycast group 204(A), which then performs the micro SID instruction for block swapping associated with the "A202" micro SID. The IPv6 packet 112 may have the SID-domain-block swapped at router "2" in the anycast group 204(A), and be sent into domain 2 108 with the destination address 114 of "FE02: 0200:F2A3:F3A4:A303:0700:F7V1:0." The IPv6 packet 112 is then routed through intermediate routers 206 in domain 2 108 according to the micro SIDs in domain 2 108 until it reaches the closest node in the anycast group 204(B). For instance, the micro SID may cause the IPv6 packet 112 to be steered to node "5" in the anycast group 204(B) based on the micro SID "A303." Node 5 in the anycast group 204(B) may then execute the micro SID instruction "A303" which is to perform block swapping to steer the IPv6 packet 112 into domain 3 110. The node 5 in anycast group 204(B) may perform the block swapping instruction such that the destination address 114 of the IPv6 packet 112 is "FE03: 0700:F7V1::" such that the IPv6 packet 112 is steered through nodes and links of domain 3 110 to the destination device 208.

Figure 3:
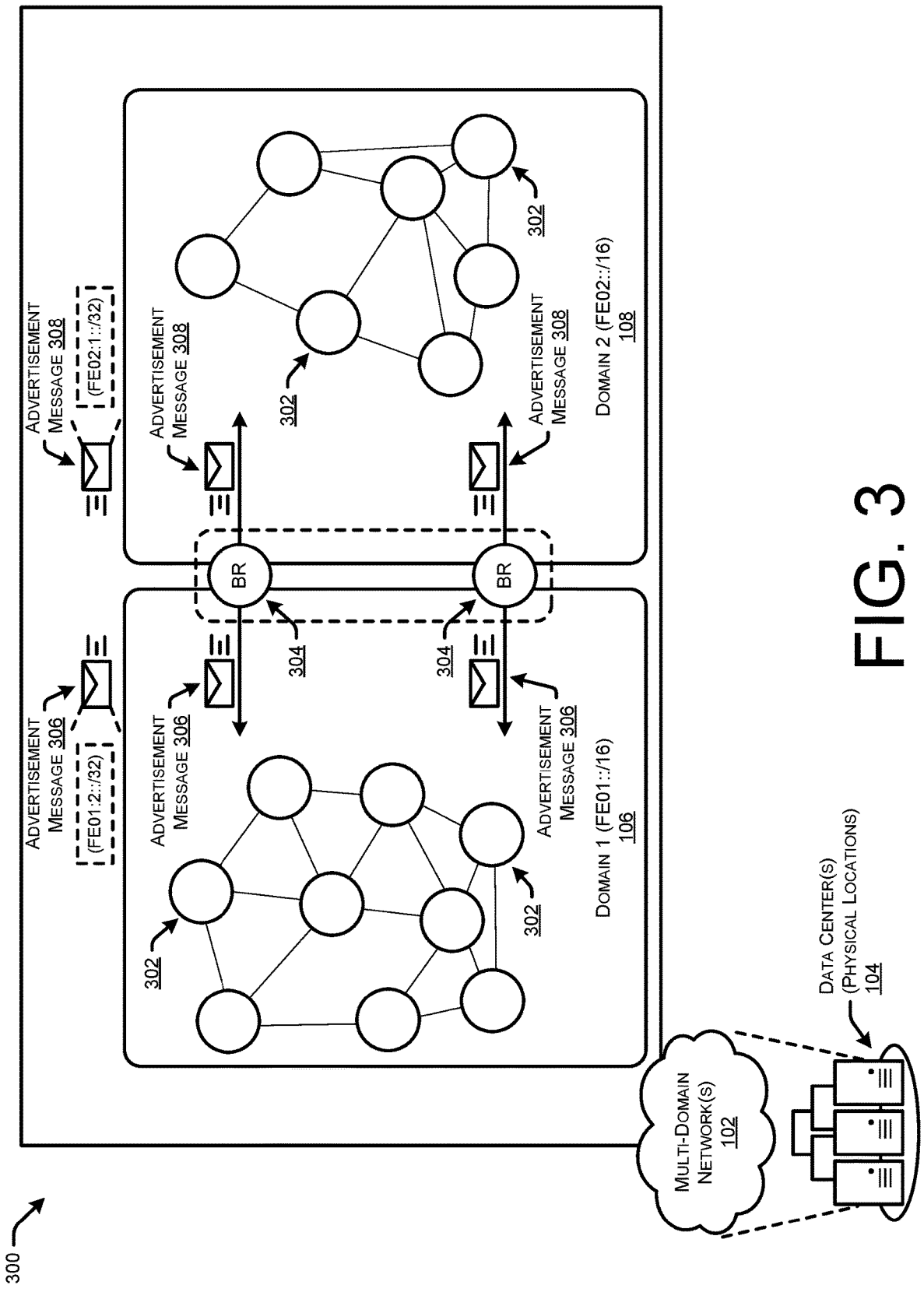
FIG. 3 illustrates a system-architecture diagram of an example multi-domain network in which border nodes in a multi-domain network advertise block swapping micro SIDs in the routing protocol into the connected domains.

FIG. 3 illustrates a system-architecture diagram 300 of an example multi-domain network 102 in which border nodes in the multi-domain network 102 advertise block swapping micro SIDs in the routing protocol into the connected domains.

As illustrated in FIG. 3, domain 1 106 and domain 2 108 may include multiple nodes 302, which may comprise source nodes 102 or intermediary nodes 102 to be used segment routing paths. As illustrated, one or more border routers 304 may send advertisement messages 306 and 308 into the domains that they border. The advertisement messages 306 may advertise a block swapping micro SID, which may have a global or a local scope. The advertisement messages 306 may be advertised in the routing protocol of all the connected domains.

As illustrated, advertisement message 306 may indicate the domain swapping instruction to the nodes 302 to enable the nodes 302 to be able to reach the domain 2 108 by including the domain swapping instruction in their IPv6 headers. For instance, the advertisement message 306 may indicate the block swapping instruction of "FE01:0002:132" for the nodes 302 in domain 1 106 to insert into IPv6 packet 112 headers to enable block swapping for the IPv6 packet 112 to reach domain 2 108. Similarly, the border routers 304 may transmit advertisement message(s) 308 into domain 2 108 that indicate the block swapping instruction of "FE02: 1:132" for the nodes 302 in domain 2 108 top insert into IPv6 packet 112 headers to enable block swapping for the IPv6 packet 112 to reach domain 1 106. In this way, the nodes 302 in each domain may receive advertisement messages 306/308 that indicate the block swapping instruction (e.g., micro SID) to be placed into IPv6 packet 112 headers (e.g., destination address field, destination header extension, etc.). in some examples the nodes 304 need not necessarily be border nodes 304, but may simply be nodes that have reachability into the target domains.

Figure 5:
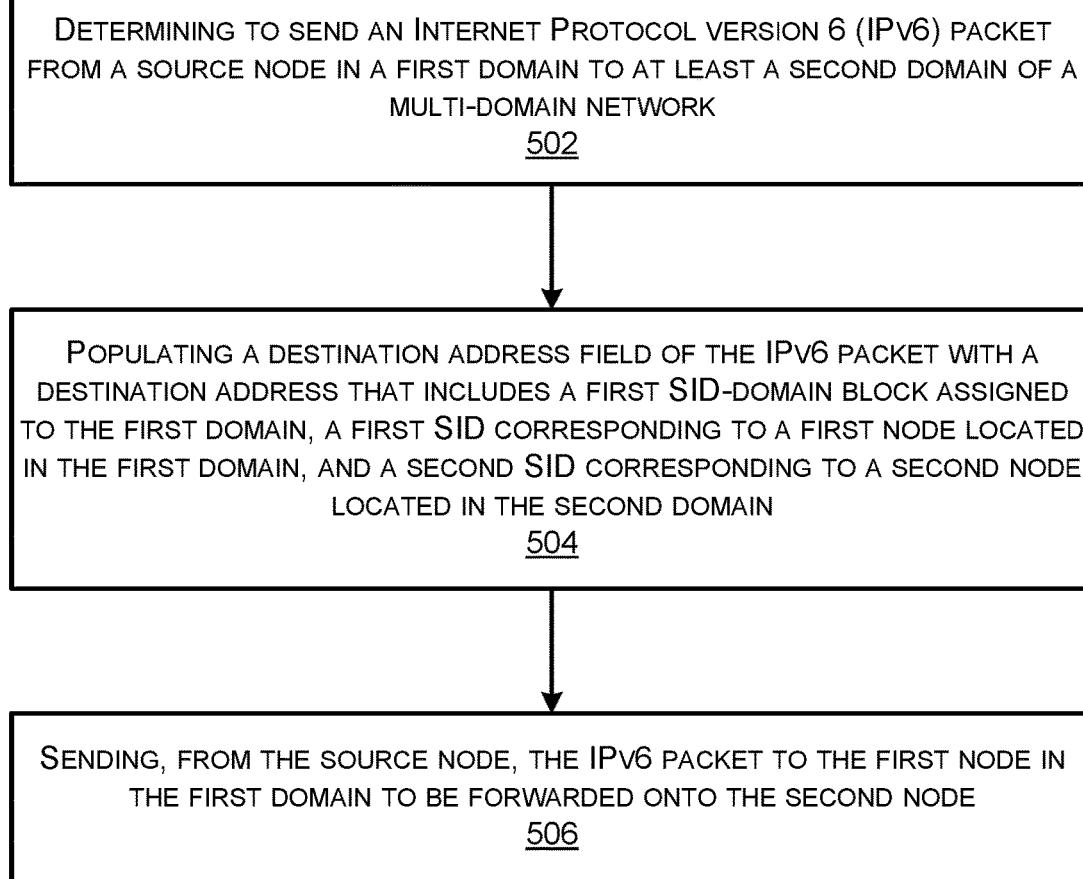
FIG. 5 illustrates a flow diagram of an example method for a source device in a multi-domain network to send an IPv6 packet using segment routing using a block swapping instruction to modify the SID-domain-blocks as the packet moves between the domains.

FIGS. 4 and 5 illustrate flow diagrams of example methods 400 and 500 that illustrate aspects of the functions performed at least partly by the devices in the multi-domain networks 102 as described in FIGS. 1-3. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, Application-Specific Integrated Circuit (ASIC), and any combination thereof. It should also be appreciated that more or fewer operations might be performed than shown in the FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for an intermediary node in a multi-domain network to receive an IPv6 packet, modify the destination address by replacing a current SID-domain-block with a destination SID-domain-block, and sending the IPv6 onto a node in a destination domain according to the SID-domain-block. In some examples, the techniques of method 400 may be performed by anode (e.g., intermediary device 118(2), node "2" in anycast group 204(A), etc.) disposed in a first domain (e.g., domain 1 106) of a multi-domain network 102. In such examples, the node may comprise one or more hardware interfaces configured to send and receive packets in the multi-domain network, one or more processors, and one or more non-transitory computer-readable media storing computer-executable instructions that, when executed by the one or more processors, cause the one or more processors to perform steps of method 400.

At 402, the node may receive, by the one or more hardware interfaces, an Internet Protocol version 6 (IPv6) packet having an IPv6 header including a destination address field that is populated with a first destination address. In such examples, the first destination address includes a first segment identifier SID-domain-block assigned to the first domain, a first SID corresponding to the node, and a second SID associated with a target node located in a second domain of the multi-domain network. Further, in such examples the first SID is associated with an instruction to change the first SID-domain-block to a second SID-domain-block assigned to the second domain in which the target node is located.

At 404, the node may modify, based at least in part on the instruction, the first destination address to result in a second destination address. The second destination address may include the second SID-domain-block assigned to the second domain, and the second SID corresponding to the target node.

In some examples, modifying the first destination address to result in the second destination address includes replacing the first SID-domain-block with the second SID-domain-block, removing the first SID from the first destination address, the first SID having a defined bit length, and shifting the second SID by the defined bit length of the first SID. In some examples, the second SID-domain-block populates a most significant bit in the destination address field and the second SID is located adjacent the second SID-domain-block in the destination address field.

At 406, the node may send, by the one or more hardware interfaces, the IPv6 packet having the IPv6 header including the destination address field populated with the second destination address.

In some examples, the node may comprise a border node (e.g., node 118(2)) between the first domain (e.g., domain 1 106) and the second domain (e.g., domain 2 108). The node may further send an advertisement message 304 to one or more first nodes in the first domain, and the advertisement message may indicate the first SID-domain-block and the first SID associated with the instruction.

In some examples, the second SID comprises a prefix SID that includes an IP address prefix assigned to the target node, and sending the IPv6 packet comprises sending the IPv6 packet to the target node based at least in part on the prefix SID. In various examples, the second SID comprises an adjacency SID that indicates a link between the node and the target node, and to send the IPv6 packet comprises sending the IPv6 packet to the target node based at least in part on the adjacency SID.

In some instance, the first SID corresponds to an anycast group in which the node is included, and the node is indicated as having reachability to one or more nodes in the second domain.

FIG. 5 illustrates a flow diagram of an example method 500 for a source node 116 in a multi-domain network 102 to send an IPv6 packet 112 using segment routing using a block swapping instruction to modify the SID-domain-blocks as the packet moves between the domains.

At 502, the source node 116, which may be in a first domain 106 in a multi-domain network 102, may determine to send an Internet Protocol version 6 (IPv6) packet to at least a second domain of the multi-domain network. In some examples, the source node 116 may receive a request for access to an end service or application in another domain of the multi-domain network 102, and the source node 116 may determine a destination device 120 for the IPv6 packet 112 to be routed to.

At 504, the source node 116 may populate a destination address field of the IPv6 packet with a destination address. The destination address may include a first segment identifier SID-domain block assigned to the first domain, a first SID corresponding to a first node located in the first domain, and a second SID corresponding to a second node located in the second domain. In such examples, the first SID is associated with an instruction for the first node to change the first SID-domain-block to a second SID-domain-block assigned to the second domain in which the second node is located.

At 506, the source node 116 may send the IPv6 packet 112 to the first node in the first domain to be forwarded onto the second node. In some examples, the method 500 may further include receiving, from first node, an advertisement message indicating that at least one of the first node is a border node or the first node has reachability to the second domain. The advertisement message may further indicate a block swapping instruction, such as the first SID that is associated with the instruction for the first node to change the first SID-domain-block to a second SID-domain-block assigned to the second domain. In some instance, the first SID corresponds to an anycast group in which the first node is included.

In various examples, the first SID comprises a prefix SID that includes an IP address prefix assigned to the first node, and sending the IPv6 packet comprises sending the IPv6 packet to the first node based at least in part on the prefix SID. In various examples, the first SID comprises an adjacency SID that indicates a link between the source node and the first node, and sending the IPv6 packet comprises sending the IPv6 packet to the first node based at least in part on the adjacency SID.

In some instance, the destination address populated in the destination address field further comprises a third SID corresponding to a third node located in a third domain of the multi-domain network. In such examples, the third SID is associated with another instruction to change the second SID-domain-block to a third SID-domain-block assigned to the third domain in which the third node is located.

Figure 6:
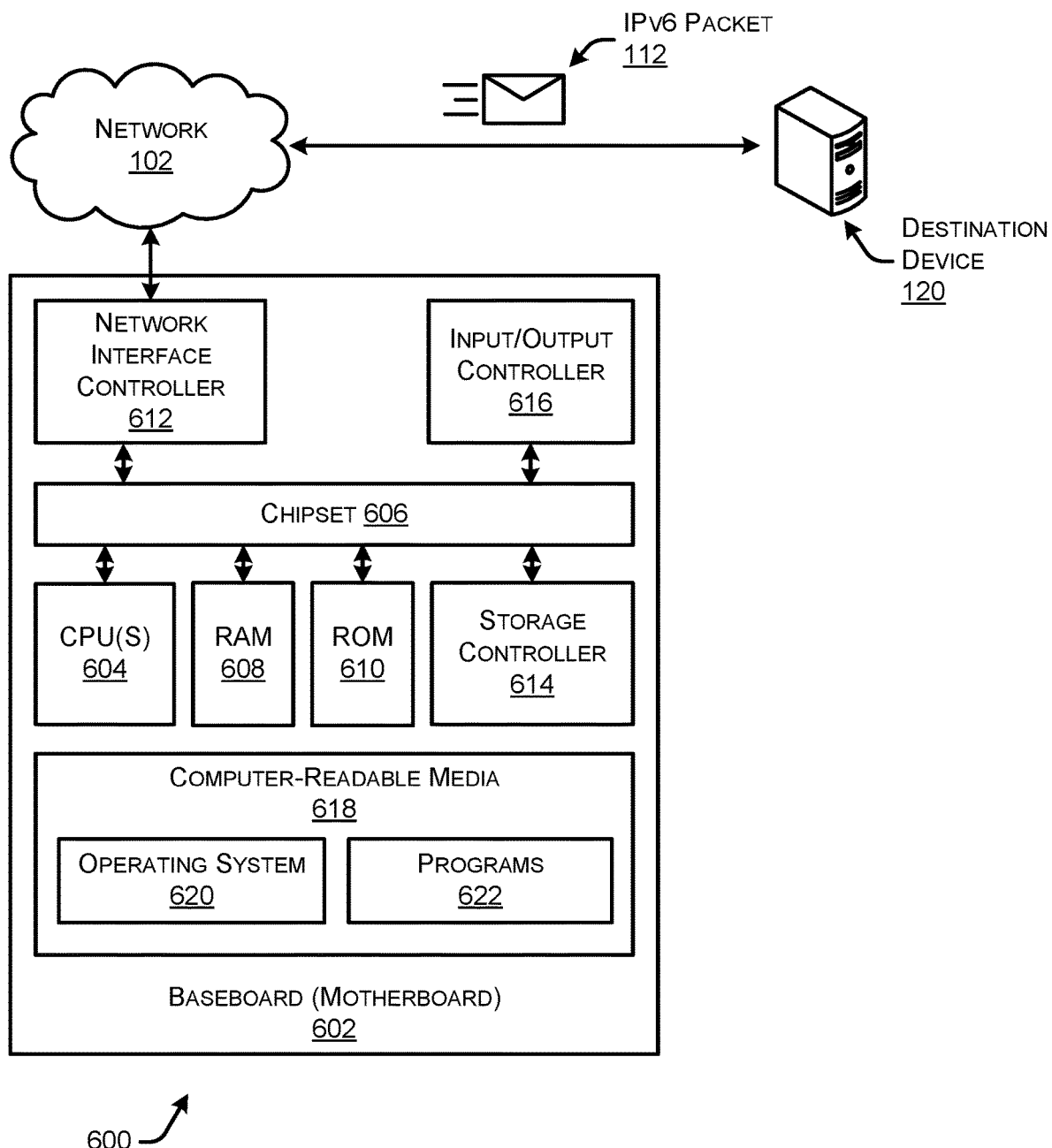
FIG. 6 is a computer architecture diagram showing an illustrative computer hardware architecture for implementing a routing device that can be utilized to implement aspects of the various technologies presented herein.

FIG. 6 shows an example computer architecture for a computer 600 capable of executing program components for implementing the functionality described above. The computer architecture shown in FIG. 6 illustrates a node in a multi-domain network 102 (e.g., source device 116, intermediary node 118, destination device 120) described herein, and may comprise networked devices such as servers, switches, routers, hubs, bridges, gateways, modems, repeaters, access points, etc. In some examples, however, the computer 600 may correspond to a conventional server computer, workstation, desktop computer, laptop, tablet, network appliance, e-reader, smartphone, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 102. The chipset 606 can include functionality for providing network connectivity through a NIC 612, such as a gigabit Ethernet adapter. The NIC 612 is capable of connecting the computer 600 to other computing devices over the network 102. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the network 102, and or any components included therein, may be supported by one or more devices similar to computer 600. Stated otherwise, some or all of the operations performed by the network 102, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a source device/node 116, an intermediary device/node 118, and/or a destination device/node 120. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the source device 116, intermediary device 118, and destination device 120. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, IP protocols, and any other communication protocol.

The programs 622 may comprise any type of programs or processes to perform the techniques described in this disclosure for routing packets through multi-domain networks 102 using domain-specific, micro-segment routing instructions (e.g., micro SIDs). For example, the programs 622 may cause the computer 600 to perform techniques for communicating with other devices using any type of protocol or standard usable for performing SRv6 using micro SIDs and swapping micro SID-domain-blocks for routing IPv6 packets 121 through multiple domains of a multi-domain network 102. Additionally, the programs 622 may comprise instructions that cause the computer 600 to perform the techniques for communicating data using various communication protocols described herein. Generally, the programs 622 may comprise one or more modules or components to perform any of the operations described herein by any of the different types of devices/nodes described herein. In some instances, the programs may run inside of virtual machines, containers, and/or other virtual resources types.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A node disposed in a first domain of a multi-domain network, the node comprising:
   one or more processors; and
   one or more non-transitory computer-readable media storing computer-executable instructions that, when executed by the one or more processors, cause the one or more processors to perform operations comprising:
   receiving an Internet Protocol version 6 (IPv6) packet having an IPv6 header populated with at least:
   a first segment identifier (SID)-block associated with a first domain of the multi-domain network; and
   an SID corresponding to a second node located in a second domain of the multi-domain network,
   swapping the first SID-block with a second SID-block associated with the second domain of the multi-domain network such the IPv6 header is populated with at least:
   the second SID-block assigned to the second domain; and
   the SID corresponding to the second node,
   wherein the swapping the first SID-block with the second SID-block includes replacing the first SID-block with the second SID-block; and
   sending the IPv6 packet having the IPv6 header including the second SID-block to the second node in the second domain.

2. The node of claim 1, wherein the node comprises a border node between the first domain and the second domain, the operations further comprising:
   sending an advertisement message to one or more first nodes in the first domain, the advertisement message indicating the first SID-block and the first SID.

3. The node of claim 1, wherein:
   the second SID comprises a prefix SID that includes an IP address prefix assigned to the second node; and
   sending the IPv6 packet comprises sending the IPv6 packet to the second node based at least in part on the prefix SID.

4. The node of claim 1, wherein:
   the node is a border router between the first domain and the second domain; and
   the first SID is associated with an instruction to swap the first SID-block with the second SID block.

5. The node of claim 1, wherein the node is indicated as having reachability to one or more nodes in the second domain.

6. The node of claim 1, wherein:
   the second SID comprises an adjacency SID that indicates a link between the node and the second node; and
   to send the IPv6 packet comprises sending the IPv6 packet to the second node based at least in part on the adjacency SID.

7. A method comprising:
   receiving, by a first node located in a first domain of a multi-domain network, an Internet Protocol version 6 (IPv6) packet having an IPv6 header populated with at least:
   a first segment identifier (SID)-block associated with the first domain; and
   an SID corresponding to a second node located in a second domain of the multi-domain network,
   swapping, by the first node, the first SID-block with a second SID-block associated with the second domain of the multi-domain network such the IPv6 header is populated with at least:
   the second SID-block assigned to the second domain; and
   the SID corresponding to the second node,
   wherein the swapping the first SID-block with the second SID-block includes replacing the first SID-block with the second SID-block; and
   sending, from the first node, the IPv6 packet having the IPv6 header including the second SID-block to the second node in the second domain.

8. The method of claim 7, wherein the first node comprises a border node between the first domain and the second domain, further comprising:

sending an advertisement message to one or more nodes in the first domain, the advertisement message indicating the first SID-block and the first SID.

9. The method of claim 7, wherein:
the second SID comprises a prefix SID that includes an IP address prefix assigned to the second node; and
sending the IPv6 packet comprises sending the IPv6 packet to the second node based at least in part on the prefix SID.

10. The method of claim 7, wherein:
the first node is a border router between the first domain and the second domain; and
the first SID is associated with an instruction to swap the first SID-block with the second SID block.

11. The method of claim 7, wherein the first node is indicated as having reachability to one or more nodes in the second domain.

12. The method of claim 7, wherein:
the second SID comprises an adjacency SID that indicates a link between the first node and the second node; and
to send the IPv6 packet comprises sending the IPv6 packet to the second node based at least in part on the adjacency SID.

13. One or more non-transitory computer-readable media storing computer-executable instructions that, when executed by one or more processors, cause the one or more processors to perform operations comprising:
receiving, by a first node located in a first domain of a multi-domain network, an Internet Protocol version 6 (IPv6) packet having an IPv6 header populated with at least:
a first segment identifier (SID)-block associated with the first domain; and
an SID corresponding to a second node located in a second domain of the multi-domain network, swapping, by the first node, the first SID-block with a second SID-block associated with the second domain of the multi-domain network such the IPv6 header is populated with at least:
the second SID-block assigned to the second domain; and
the SID corresponding to the second node,
wherein the swapping the first SID-block with the second SID-block includes replacing the first SID-block with the second SID-block; and
sending, from the first node, the IPv6 packet having the IPv6 header including the second SID-block to the second node in the second domain.

14. The one or more non-transitory computer-readable media of claim 13, wherein the first node comprises a border node between the first domain and the second domain, the operations further comprising:
sending an advertisement message to one or more nodes in the first domain, the advertisement message indicating the first SID-block and the first SID.

15. The one or more non-transitory computer-readable media of claim 13, wherein:
the second SID comprises a prefix SID that includes an IP address prefix assigned to the second node; and
sending the IPv6 packet comprises sending the IPv6 packet to the second node based at least in part on the prefix SID.

16. The one or more non-transitory computer-readable media of claim 13, wherein:
the first node is a border router between the first domain and the second domain; and
the first SID is associated with an instruction to swap the first SID-block with the second SID block.

17. The one or more non-transitory computer-readable media of claim 13, wherein the first node is indicated as having reachability to one or more nodes in the second domain.

* * * * *